(12) United States Patent
Misra et al.

(10) Patent No.: US 11,062,142 B2
(45) Date of Patent: Jul. 13, 2021

(54) NATURAL LANGUAGE UNIFICATION BASED ROBOTIC AGENT CONTROL

(71) Applicant: ACCENTURE GLOBAL SOLUTIONS LIMITED, Dublin (IE)

(72) Inventors: Janardan Misra, Bangalore (IN); Sanjay Podder, Thane (IN); Divya Rawat, Dehradun (IN); Bhaskar Ghosh, Bangalore (IN); Neville Dubash, Mumbai (IN)

(73) Assignee: ACCENTURE GOBAL SOLUTIONS LIMITED, Dublin (IE)

( * ) Notice: Subject to any disclaimer, the term of this patent is extended or adjusted under 35 U.S.C. 154(b) by 333 days.

(21) Appl. No.: 16/020,566

(22) Filed: Jun. 27, 2018

(65) Prior Publication Data
US 2019/0005328 A1 Jan. 3, 2019

(30) Foreign Application Priority Data
Jun. 29, 2017 (IN) .............................. 201741022771

(51) Int. Cl.
*G06F 7/00* (2006.01)
*G06K 9/00* (2006.01)
(Continued)

(52) U.S. Cl.
CPC ....... *G06K 9/00684* (2013.01); *G06F 16/367* (2019.01); *G06F 16/90332* (2019.01);
(Continued)

(58) Field of Classification Search
CPC .. G06F 16/367; G06F 16/90332; G06F 40/56; G06F 40/216; G06F 40/30;
(Continued)

(56) References Cited

U.S. PATENT DOCUMENTS 5,899,956 A 5/1999 Chan
6,542,788 B2 4/2003 Hosonuma
(Continued)

OTHER PUBLICATIONS

An overview of empirical natural language processing, Eric Brill et al., AI magazine, Pro Quest, Winter 1997, pp. 13-24.
(Continued)

*Primary Examiner* — Azam M Cheema
(74) *Attorney, Agent, or Firm* — Mannava & Kang, P.C.

(57) ABSTRACT

In some examples, natural language unification based robotic agent control may include ascertaining, by a robotic agent, an image of an object or an environment, and ascertaining a plurality of natural language insights for the image. A semantic relatedness may be determined between each insight of the plurality of insights, and a semantic relatedness graph may be generated for the plurality of insights. For each insight of the plurality of insights, at least one central concept may be identified. Based on the semantic relatedness graph and the identified at least one central concept, the plurality of insights may be clustered to generate at least one insights cluster. For insights included in the least one insights cluster, a unified insight may be generated. Further, an operation associated with the robotic agent, the object, or the environment may be controlled by the robotic agent and based on the unified insight.

20 Claims, 24 Drawing Sheets

(51) Int. Cl.
*G06N 3/00* (2006.01)
*G06F 16/36* (2019.01)
*G06F 16/9032* (2019.01)
*G06K 9/72* (2006.01)
*G06N 5/02* (2006.01)
*G06F 40/30* (2020.01)
*G06F 40/56* (2020.01)
*G06F 40/216* (2020.01)
*B25J 9/16* (2006.01)
*G06N 5/04* (2006.01)
*G06N 20/00* (2019.01)

(52) U.S. Cl.
CPC ............ *G06F 40/216* (2020.01); *G06F 40/30* (2020.01); *G06F 40/56* (2020.01); *G06K 9/00671* (2013.01); *G06K 9/726* (2013.01); *G06N 3/006* (2013.01); *G06N 3/008* (2013.01); *G06N 5/022* (2013.01); *B25J 9/1697* (2013.01); *G06K 9/00664* (2013.01); *G06N 5/048* (2013.01); *G06N 20/00* (2019.01)

(58) Field of Classification Search
CPC ........... G06K 9/00684; G06K 9/00671; G06K 9/726; G06K 9/00664; G06N 3/006; G06N 3/008; G06N 5/022; G06N 5/048; G06N 20/00; B25J 9/1697
See application file for complete search history.

(56) References Cited

U.S. PATENT DOCUMENTS

| | | | |
|---|---|---|---|
| 8,180,760 B1* | 5/2012 | Carver | G06F 16/355 707/708 |
| 8,200,204 B2 | 6/2012 | Cho | |
| 9,037,296 B2 | 5/2015 | Choe | |
| 2001/0021882 A1 | 9/2001 | Hosonuma | |
| 2004/0024720 A1 | 2/2004 | Fairweather | |
| 2004/0071347 A1 | 4/2004 | Kaplan | |
| 2004/0093328 A1* | 5/2004 | Damle | G06F 16/345 |
| 2006/0143017 A1 | 6/2006 | Sonoura | |
| 2006/0222238 A1 | 10/2006 | Mishiyama | |
| 2007/0047809 A1 | 3/2007 | Sasaki | |
| 2007/0192910 A1 | 8/2007 | Vu | |
| 2008/0119959 A1 | 5/2008 | Park | |
| 2009/0232387 A1 | 9/2009 | Gulati | |
| 2010/0329504 A1 | 12/2010 | Chen | |
| 2011/0122247 A1 | 5/2011 | Kim | |
| 2012/0195499 A1 | 8/2012 | Hosomi | |
| 2012/0242473 A1 | 9/2012 | Choi | |
| 2014/0157299 A1 | 6/2014 | Alcala | |
| 2014/0280952 A1* | 9/2014 | Shear | H04L 63/10 709/226 |
| 2015/0356414 A1 | 12/2015 | Sanchez | |
| 2016/0284217 A1 | 9/2016 | Lee | |
| 2016/0321259 A1* | 11/2016 | Bastian | G06Q 50/01 |
| 2016/0378861 A1* | 12/2016 | Eledath | G06K 9/00718 707/766 |
| 2017/0040019 A1* | 2/2017 | Ichimura | G10L 15/08 |
| 2017/0089714 A1 | 3/2017 | Liu | |
| 2017/0116187 A1 | 4/2017 | Erickson | |
| 2017/0125008 A1 | 5/2017 | Maisonnier | |
| 2017/0361468 A1 | 12/2017 | Cheuvront | |
| 2018/0012590 A1 | 1/2018 | Heo | |
| 2018/0285386 A1 | 10/2018 | Liu | |
| 2019/0158443 A1 | 5/2019 | Liao | |

OTHER PUBLICATIONS

Towards a construction-based—Simulation, Peter Ford Dominey, Elsevier, 0925-2312, 2006, pp. 2288-2302.

Robot navigation based—Graphs, Christian Mandel et al., IEEE, Jan. 4244-0259,2006, pp. 205-210.

Wiriyathammabhum, Peratham et al., "Computer Vision and Natural Language Processing: Recent Approaches in Multimedia and Robotics", (Dec. 2016), Computer Vision and Natural Language Processing: Recent Approaches in Multimedia and Robotics. ACM Computing Surveys. 49. 1-44. 10.1145/3009906.

* cited by examiner

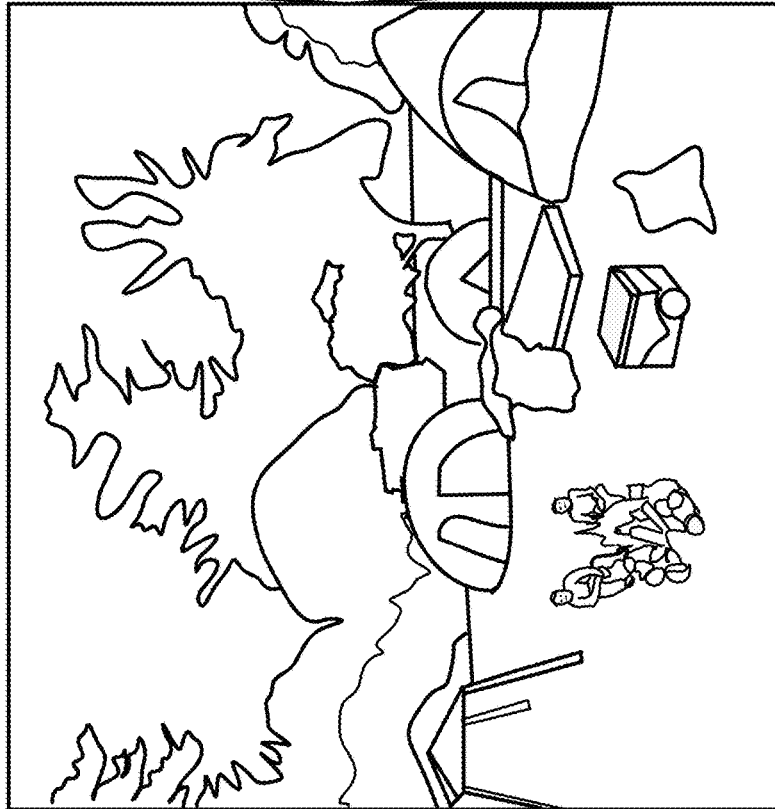

| | |
|---|---|
| Insight 1 | A campground with a woman |
| Insight 2 | Among trees and bushes there is a camping site |
| Insight 3 | Picnic tables and chairs with tents on a campsite |
| Insight 4 | Some trees near to a group of people camping in tents |
| Insight 5 | A group of people camping together |
| Insight 6 | A scenic picnic spot with lots of trees around, Mountains nearby and group of people sitting around their tents. |
| Insight 7 | A group of people camping and relaxing in the vicinity of nature. |
| Insight 8 | Some camping going on and food, chairs, tables and tents are around |
| Insight 9 | Picnic or outing involving camping. The ground is Surrounded by a variety of green trees. There must be 20 people in the picnic |
| Insight 10 | It's a beautiful place for an outing nice mountain view so many trees good place to chill out with family and friends |
| Insight 11 | It's an awesome place for outing, rejuvenating and having fun. The view is awesome and full of greenery. Perfect place for family and friends get together. |

FIG. 4

From Multiple Insights to Multi-Level Insights

| | |
|---|---|
| Insight 1 | A campground with a woman |
| Insight 2 | Among trees and bushes there is a camping site |
| Insight 3 | Picnic tables and chairs with tents on a campsite |
| Insight 4 | Some trees near to a group of people camping in tents |
| Insight 5 | A group of people camping together |
| Insight 6 | A scenic picnic spot with lots of trees around, Mountains nearby and group of people sitting around their tents. |
| Insight 7 | A group of people camping and relaxing in the vicinity of nature |
| Insight 8 | Some camping going on and food, chairs, tables and tents are around |
| Insight 9 | Picnic or outing involving camping. The ground is Surrounded by a variety of green trees. There Must be 20 people in the picnic |
| Insight 10 | It's a beautiful place for an outing nice mountain view so many trees good place to chill out with family and friends |
| Insight 11 | It's an awesome place for outing, rejuvenating and having fun. The view is awesome and full of greenery. Perfect place for family and friends get together. |

How natural insight are?
How reliable insight are?
How concise insight are?
How atypical insights are?
How to-the-point insight are?
Which are potentially inconsistent or erroneous insights?
Which insights are semantically similar or duplicates or redundant?
What are the central concepts embedded in these insights?
How are these insights semantically related with one another?
How to unify insights into semantically coherent manner?

FIG. 5

(*) How natural insights are?

Are there any potentially inconsistent or erroneous insights?

Most natural (consistent) insight

For each insight:
1. Transform insight into intrinsic semantic relatedness graph and estimate intrinsic semantic consistency (ISC) Score
2. Estimate likelihood of all part-of-speech (POS) trigrams within insight. Mean likelihood score across all trigrams is POS_Score for the insight
3. Estimate Naturalness_Score (NS) as an average of ISC_Score and POS_Score
4. Rank insights based upon Naturalness_Score

Least natural (Potentially inconsistent or erroneous insight)

| SN | Insight |
|---|---|
| Insight 3 | Picnic tables and chairs with tents on a campsite |
| Insight 11 | It's an awesome place for outing, rejuvenating and having fun. The view is awesome and full of greenery. Perfect place for family and friends get together. |
| Insight 10 | It's a beautiful place for an outing nice mountain view so many trees good place to chill out with family and friends |
| Insight 9 | Picnic or outing involving camping. The ground is surrounded by a variety of green trees. There must be 20 people in the picnic |
| Insight 4 | Some trees near to a group of people camping in tents |
| Insight 5 | A group of people camping together |
| Insight 8 | Some camping going on and food, chairs, tables and tents are around |
| Insight 6 | A scenic picnic spot with lots of trees around, mountains nearby and group of people sitting around their tents. |
| Insight 7 | A group of people camping and relaxing in the vicinity of nature. |
| Insight 2 | Among trees and bushes there is a camping site |
| Insight 1 | A campground with a woman |

FIG. 6

What are the central concepts embedded in these insights?

| | |
|---|---|
| Insight 1 | A campground with a woman |
| Insight 2 | Among trees and bushes there is a camping site |
| Insight 3 | Picnic tables and chairs with tents on a campsite |
| Insight 4 | Some trees near to a group of people camping in tents |
| Insight 5 | A group of people camping together |
| Insight 6 | A scenic picnic spot with lots of trees around, mountains nearby and group of people sitting around their tents. |
| Insight 7 | A group of people camping and relaxing in the vicinity of nature. |
| Insight 8 | Some camping going on and food, chairs, tables and tents are around |
| Insight 9 | Picnic or outing involving camping. The ground is surrounded by a variety of green trees. There must be 20 people in the picnic. |
| Insight 10 | It's a beautiful place for an outing nice mountain view so many trees good place to chill out with family and friends |
| Insight 11 | It's an awesome place for outing, rejuvenating and having fun. The view is awesome and full of greenery. Perfect place for family and friends get together. |

- Extract concepts from insights
- Determine different semantic relatedness among concept terms across insights including
  - Semantic similarities
  - Ontological relations, and
  - Dependencies
- Form concept graph and estimate semantic centrality measure for each concept term to determine central concepts Camp, people, tents, trees

FIG. 10

How are insights semantically related with one another?

| | |
|---|---|
| Insight 1 | A campground with a woman |
| Insight 2 | Among trees and bushes there is a camping site |
| Insight 3 | Picnic tables and chairs with tents on a campsite |
| Insight 4 | Some trees near to a group of people camping in tents |
| Insight 5 | A group of people camping together |
| Insight 6 | A scenic picnic spot with lots of trees around, mountains nearby and group of people sitting around their tents. |
| Insight 7 | A group of people camping and relaxing in the vicinity of nature. |
| Insight 8 | Some camping going on and food, chairs, tables and tents are around |
| Insight 9 | Picnic or outing involving camping. The ground is surrounded by a variety of green trees. There must be 20 people in the picnic. |
| Insight 10 | It's a beautiful place for an outing nice mountain view so many trees good place to chill out with family and friends |
| Insight 11 | It's an awesome place for outing, rejuvenating and having fun. The view is awesome and full of greenery. Perfect place for family and friends get together. |

- Form semantic relatedness graph among insights
- Apply graph clustering technique to determine groups of highly related insights

FIG. 11

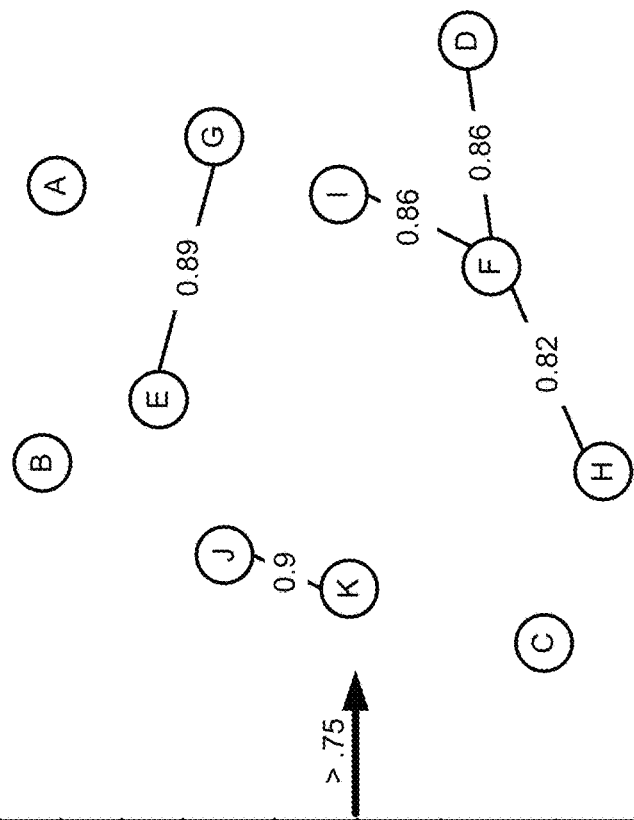

Different Clusters of insights appear with differing similarity thresholds!

| | |
|---|---|
| A | A campground with a woman |
| B | Among trees and bushes there is a camping site |
| C | Picnic tables and chairs with tents on a campsite |
| D | Some trees near to a group of people camping in tents |
| E | A group of people camping together |
| F | A scenic picnic spot with lots of trees around, mountains nearby and group of people sitting around their tents. |
| G | A group of people camping and relaxing in the vicinity of nature. |
| H | Some camping going on and food, chairs, tables and tents are around |
| I | Picnic or outing involving camping. The ground is surrounded by a variety of green trees. There must be 20 people in the picnic. |
| J | It's a beautiful place for an outing nice mountain view so many trees good place to chill out with family and friends fun. The view is awesome and full of greenery. Perfect place |
| K | It's an awesome place for outing, rejuvenating and having for family and friends get together. |

FIG. 12

Clustering insights into semantically coherent groups

Cluster 1
- [A] A campground with a woman

Cluster 2
- [B] Among trees and bushes there is a camping site

Cluster 3
- [E] A group of people camping together
- [G] A group of people camping and relaxing in the vicinity of nature

Cluster 4
| | |
|---|---|
| C | Picnic tables and chairs with tents on a campsite |
| D | Some trees near to a group of people camping in tents |
| F | A scenic picnic spot with lots of trees around, mountains nearby and group of people sitting around their tents |
| H | Some camping going on and food, chairs, tables and tents are around |
| ... | |

Insights

| ID | Insights |
|---|---|
| A | A campground with a woman |
| B | Among trees and bushes there is a camping site |
| C | Picnic tables and chairs with tents on a campsite |
| D | Some trees near to a group of people camping in tents |
| E | A group of people camping together |
| F | A scenic picnic spot with lots of trees around, mountains nearby and group of people sitting around their tents. |
| G | A group of people camping and relaxing in the vicinity of nature. |
| H | Some camping going on and food, chairs, tables and tents are around |
| I | Picnic or outing involving camping. The ground is surrounded by a variety of green trees. There must be 20 people in the picnic. |
| J | It's a beautiful place for an outing nice mountain view so many trees good place to chill out with family and friends |
| K | It's an awesome place for outing, rejuvenating and having fun. The view is awesome and full of greenery. Perfect place for family and friends get together. |

```
┌─────────────────────────────────────────────────────────────┐
│  ASCERTAIN, BY A ROBOTIC AGENT, AN IMAGE OF AN OBJECT OR AN │
│                        ENVIRONMENT                          │
│                            2202                             │
└─────────────────────────────────────────────────────────────┘
                              │
                              ▼
┌─────────────────────────────────────────────────────────────┐
│   ASCERTAIN A PLURALITY OF NATURAL LANGUAGE INSIGHTS FOR THE│
│                            IMAGE                            │
│                            2204                             │
└─────────────────────────────────────────────────────────────┘
                              │
                              ▼
┌─────────────────────────────────────────────────────────────┐
│  DETERMINE SEMANTIC RELATEDNESS BETWEEN EACH INSIGHT OF     │
│                THE PLURALITY OF INSIGHTS                    │
│                            2206                             │
└─────────────────────────────────────────────────────────────┘
                              │
                              ▼
┌─────────────────────────────────────────────────────────────┐
│  GENERATE, BASED ON THE DETERMINED SEMANTIC RELATEDNESS, A  │
│  SEMANTIC RELATEDNESS GRAPH FOR THE PLURALITY OF INSIGHTS   │
│                            2208                             │
└─────────────────────────────────────────────────────────────┘
                              │
                              ▼
┌─────────────────────────────────────────────────────────────┐
│  IDENTIFY, FOR EACH INSIGHT OF THE PLURALITY OF INSIGHTS, AT│
│                  LEAST ONE CENTRAL CONCEPT                  │
│                            2210                             │
└─────────────────────────────────────────────────────────────┘
                              │
                              ▼
┌─────────────────────────────────────────────────────────────┐
│  CLUSTER, BASED ON THE SEMANTIC RELATEDNESS GRAPH AND THE   │
│  IDENTIFIED AT LEAST ONE CENTRAL CONCEPT, THE PLURALITY OF  │
│   INSIGHTS TO GENERATE A PLURALITY OF INSIGHTS CLUSTERS     │
│                            2212                             │
└─────────────────────────────────────────────────────────────┘
                              │
                              ▼
┌─────────────────────────────────────────────────────────────┐
│ GENERATE, FOR INSIGHTS INCLUDED IN THE PLURALITY OF INSIGHTS│
│ CLUSTERS, A UNIFIED INSIGHT FOR EACH INSIGHTS CLUSTER OF THE│
│               PLURALITY OF INSIGHTS CLUSTERS                │
│                            2214                             │
└─────────────────────────────────────────────────────────────┘
```

RANK EACH UNIFIED INSIGHT ACCORDING TO A RANKING CRITERION
2216

CONTROL, BY THE ROBOTIC AGENT AND BASED ON A HIGHEST RANKED UNIFIED INSIGHT, AN OPERATION ASSOCIATED WITH THE ROBOTIC AGENT, THE OBJECT, OR THE ENVIRONMENT
2218

NATURAL LANGUAGE UNIFICATION BASED ROBOTIC AGENT CONTROL

PRIORITY

This application is a Non-Provisional application of commonly assigned and co-pending India Provisional Application Serial Number 201741022771, filed Jun. 29, 2017, and claims priority to commonly assigned and concurrently filed U.S. patent application titled "Natural Language Eminence based Robotic Agent Control", the disclosures of which are hereby incorporated by reference in their entireties.

BACKGROUND

A variety of techniques may be used to control a robotic system. For example, the robotic system may be pre-programmed with a set of instructions to perform a specified task, and/or to control a secondary device. Alternatively, the robotic system may obtain an image of an object or environment using a camera or another viewing device, and determine and/or receive, based on the image, a set of instructions.

BRIEF DESCRIPTION OF DRAWINGS

Features of the present disclosure are illustrated by way of example and not limited in the following figure(s), in which like numerals indicate like elements, in which:

FIG. 4 illustrates another image and possible insights to illustrate operation of the natural language unification based robotic agent control apparatus of FIG. 1 in accordance with an example of the present disclosure;

FIG. 5 illustrates the aspect of multiple insights to multi-level insights to illustrate operation of the natural language unification based robotic agent control apparatus of FIG. 1 in accordance with an example of the present disclosure;

FIG. 6 illustrates determination of how natural insights are (e.g., determination of potentially inconsistent or erroneous insights) by transformation of each insight into a semantic graph and estimation of a naturalness score to illustrate operation of the natural language unification based robotic agent control apparatus of FIG. 1 in accordance with an example of the present disclosure;

FIG. 10 illustrates determination of central concepts embedded in insights to illustrate operation of the natural language unification based robotic agent control apparatus of FIG. 1 in accordance with an example of the present disclosure;

FIG. 11 illustrates determination of semantic relatedness between insights to illustrate operation of the natural language unification based robotic agent control apparatus of FIG. 1 in accordance with an example of the present disclosure;

FIG. 12 illustrates relatedness thresholds with respect to clusters to illustrate operation of the natural language unification based robotic agent control apparatus of FIG. 1 in accordance with an example of the present disclosure;

FIG. 13 illustrates clustering insights into semantically coherent groups to illustrate operation of the natural language unification based robotic agent control apparatus of FIG. 1 in accordance with an example of the present disclosure;

DETAILED DESCRIPTION

Figure 1:
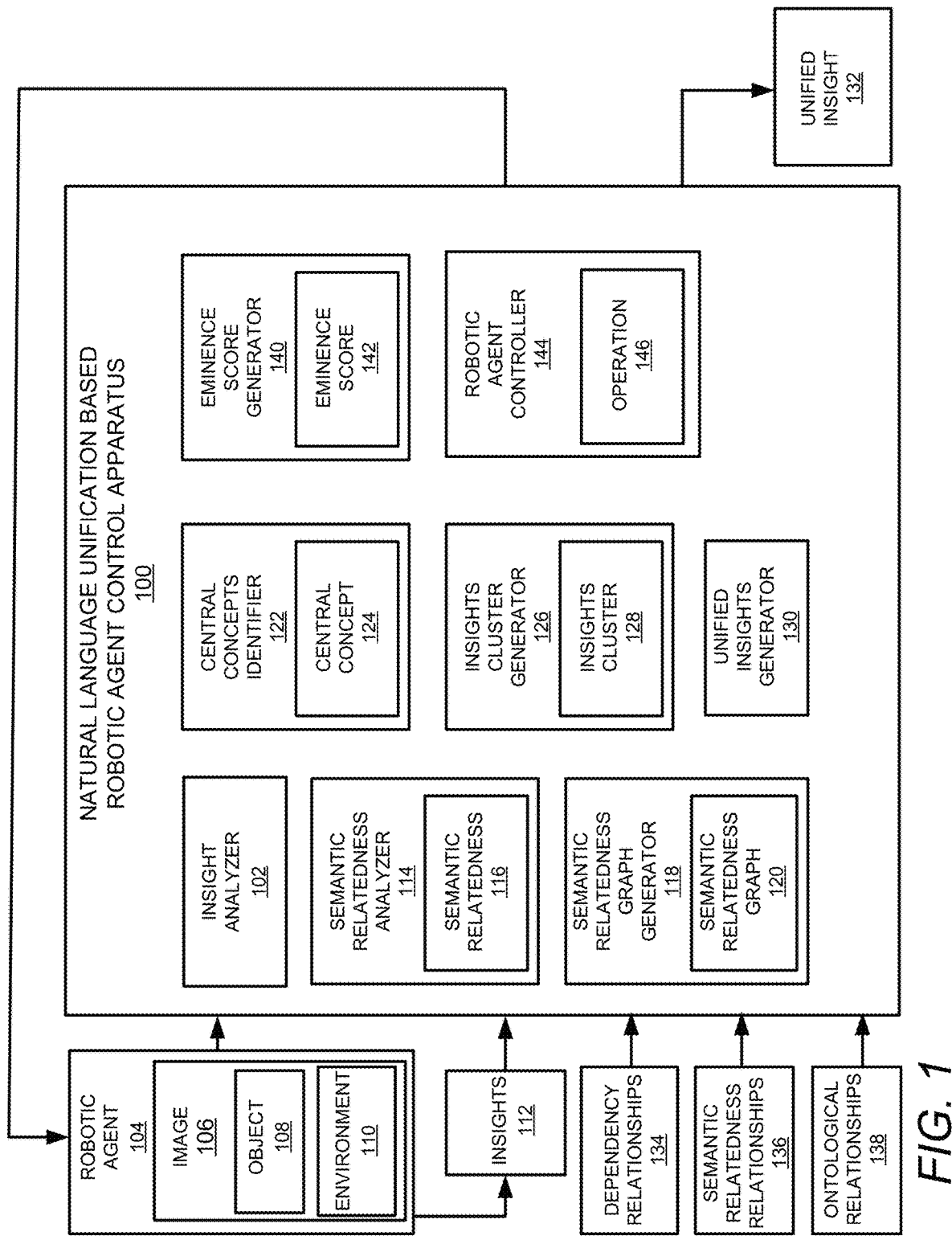
FIG. 1 illustrates a layout of a natural language unification based robotic agent control apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Natural language unification based robotic agent control apparatuses, methods for natural language unification based robotic agent control, and non-transitory computer readable media having stored thereon machine readable instructions to provide natural language unification based robotic agent control are disclosed herein. The apparatuses, methods, and non-transitory computer readable media disclosed herein provide for natural language unification based robotic agent control by ascertaining, by a robotic agent, an image of an object or an environment, and ascertaining a plurality of natural language insights for the image. A robotic agent may include a hardware and software device that may not be explicitly programmed to make decisions in uncertain environments (thus, it may be unknown what decisions a robotic agent may take in a new environment). A semantic relatedness may be determined between each insight of the plurality of insights. Semantic relatedness may indicate, for example, that two elements are related to each other, and semantic similarity may represent a specific type of semantic relatedness, which may indicate that the elements are equivalent as far as their usage is concerned. Based on the determined semantic relatedness, a semantic relatedness graph may be generated for the plurality of insights. For each insight of the plurality of insights, at least one central concept may be identified. Based on the semantic relatedness graph and the identified at least one central concept, the plurality of insights may be clustered to generate at least one insights cluster. For insights included in the least one insights cluster, a unified insight may be generated. Further, an operation associated with the robotic agent, the object, or the environment may be controlled by the robotic agent and based on the unified insight.

With respect to natural language unification, the apparatuses, methods, and non-transitory computer readable media disclosed herein provide for analysis of natural language text data (e.g., in the form of descriptions), for example, for images for visually impaired users, robotics, etc. In this regard, the natural language text data may be referred to as insights as disclosed herein.

With respect to control of a robotic system that may include a robotic agent such as a machine, a vehicle, or another such device, in order to perform a specified task, and/or to control a secondary device, a variety of techniques may be used. For example, the robotic agent may obtain an image of an object or environment using a camera or another viewing device, and determine and/or receive, based on the image, a set of instructions. The instructions may be presented in the form of insights with respect to the image. Alternatively, even if the instructions are not related to an image, a plurality of instructions may be presented in the form of insights to control the robotic agent, and/or to utilize the robotic agent to control a further device. With respect to an image, the image may be analyzed to identify objects within the image. An image may also be analyzed to determine and/or ascertain insights with respect to the image and the identified objects. When a plurality of insights are presented to the robotic agent with or without respect to an image, it is technically challenging for the robotic agent to eliminate uncertainties with respect to the plurality of insights, and to make a decision with respect to the plurality of insights, and/or with respect to the object or the environment being viewed by the robotic agent. The decision as disclosed herein may include performing a specified task such as manipulation of an object in the image, controlling a secondary device to perform a further task, and generally performing any type of operation that may be performed by a robotic agent.

In the field of visually impaired users, when such a user views an image, it is similarly technically challenging to eliminate uncertainties with respect to a plurality of insights related to the image, and to present the user with an insight that correctly represents content of the image.

In order to address at least the aforementioned technical challenges related, for example, to a plurality of insights that may be related to an image of an object or an environment being viewed by the robotic agent, a plurality of insights that may be related to a plurality of instructions received by a robotic agent, a plurality of insights that may be related to an image that is to be viewed or being viewed by visually impaired user, and other types of insights generally, the apparatuses, methods, and non-transitory computer readable media disclosed herein may analyze an ensemble of multiple services by extracting a semantically unified view from a multitude of outputs from different services. The apparatuses, methods, and non-transitory computer readable media disclosed herein may generate a multi-level semantically unified view for an end user and/or a robotic system from multiple heterogeneous insights that may be received and/or generated by different artificial intelligence services. In this regard, the apparatuses, methods, and non-transitory computer readable media disclosed herein may present a semantically unified view to a user, such as a visually impaired user, by selecting the best description, and by combining related descriptions together. Similarly, the apparatuses, methods, and non-transitory computer readable media disclosed herein may present a semantically unified instruction to control a robotic system and/or to be utilized by the robotic system to control a secondary device.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example natural language unification based robotic agent control apparatus (hereinafter also referred to as "apparatus 100").

Referring to FIG. 1, the apparatus 100 may include an insight analyzer 102 that is executed by at least one hardware processor (e.g., the hardware processor 2102 of FIG. 21, and/or the hardware processor 2304 of FIG. 23), to ascertain, by a robotic agent 104, an image 106 of an object 108 or an environment 110, and ascertain a plurality of natural language insights 112 for the image 106.

A semantic relatedness analyzer 114 that is executed by the at least one hardware processor (e.g., the hardware processor 2102 of FIG. 21, and/or the hardware processor 2304 of FIG. 23) may determine semantic relatedness 116 between each insight of the plurality of insights 112.

According to examples disclosed herein, the semantic relatedness analyzer 114 may determine semantic relatedness 116 between each insight of the plurality of insights 112 by determining, based on the determined semantic relatedness 116, whether an insight of the plurality of insights 112 is a duplicate of another insight of the plurality of insights 112, and, based on a determination that the insight of the plurality of insights 112 is the duplicate of the other insight of the plurality of insights 112, removing the insight of the plurality of insights 112 to generate a set of non-redundant insights.

According to examples disclosed herein, the semantic relatedness analyzer 114 may determine semantic relatedness 116 between each insight of the plurality of insights 112 by identifying terms of an insight, and determining, for each term of the identified terms, a relevance to all other terms of the insight.

A semantic relatedness graph generator 118 that is executed by the at least one hardware processor (e.g., the hardware processor 2102 of FIG. 21, and/or the hardware processor 2304 of FIG. 23) may generate, based on the determined semantic relatedness 116, a semantic relatedness graph 120 for the plurality of insights 112.

A central concepts identifier 122 that is executed by the at least one hardware processor (e.g., the hardware processor 2102 of FIG. 21, and/or the hardware processor 2304 of FIG. 23) may identify, for each insight of the plurality of insights 112, at least one central concept 124.

An insights cluster generator 126 that is executed by the at least one hardware processor (e.g., the hardware processor 2102 of FIG. 21, and/or the hardware processor 2304 of FIG. 23) may cluster, based on the semantic relatedness graph 120 and the identified at least one central concept 124, the plurality of insights 112 to generate at least one insights cluster 128.

A unified insights generator 130 that is executed by the at least one hardware processor (e.g., the hardware processor 2102 of FIG. 21, and/or the hardware processor 2304 of FIG. 23) may generate, for insights included in the least one insights cluster 128, a unified insight 132.

According to examples disclosed herein, the unified insights generator 130 may generate, for the insights included in the least one insights cluster 128, the unified insight 132 by analyzing, for the insights included in the at least one insights cluster 128, dependency relationships 134 between the identified at least one central concept 124, semantic relatedness relationships 136 between the identified at least one central concept 124, and ontological relationships 138 between the identified at least one central concept 124, and generating, based on the dependency relationships 134, the semantic relatedness relationships 136, and the ontological relationships 138, the unified insight 132.

According to examples disclosed herein, the unified insights generator 130 may generate, for the insights included in the least one insights cluster, the unified insight 132 by extracting, for the insights included in the least one insights cluster 128, subject, predicate, and object tuples, and generating, based on the extraction of the subject, predicate, and object tuples, the unified insight 132.

According to examples disclosed herein, the unified insights generator 130 may generate, for the insights included in the least one insights cluster 128, the unified insight 132 by merging the extracted subject, predicate, and object tuples, and generating, based on the merged subject, predicate, and object tuples, the unified insight 132.

According to examples disclosed herein, the unified insights generator 130 may extract, for the insights included in the least one insights cluster 128, the subject, predicate, and object tuples, and merge the extracted subject, predicate, and object tuples by generating dependency parse trees for the insights included in the least one insights cluster 128, and merging, based on the dependency parse trees, the extracted subject, predicate, and object tuples.

According to examples disclosed herein, the unified insights generator 130 may generate, for the insights included in the least one insights cluster 128, the unified insight 132 by identifying, for the insights included in the at least one insights cluster 128, an insight including a highest number of concept terms, designating the insight including the highest number of concept terms as a base insight, and expanding the base insight to generate the unified insight 132.

According to examples disclosed herein, the unified insights generator 130 may generate, for the insights included in the least one insights cluster 128, the unified insight 132 by determining, for each of the insights included in the at least one insights cluster 128, the subject, predicate, and object tuples, generating a semantic relatedness graph for predicates of the determined subject, predicate, and object tuples, determining, for the semantic relatedness graph generated for the predicates of the determined subject, predicate, and object tuples, whether an edge includes a weight that is less than a specified weight, and based on a determination that the edge includes the weight that is less than the specified weight, removing the edge with respect to the unified insight 132.

According to examples disclosed herein, the unified insights generator 130 may generate, for the insights included in the least one insights cluster 128, the unified insight 132 by determining, for each of the insights included in the at least one insights cluster 128, the subject, predicate, and object tuples, generating a semantic relatedness graph for predicates of the determined subject, predicate, and object tuples, determining, for the semantic relatedness graph generated for the predicates of the determined subject, predicate, and object tuples, whether an edge includes a weight that is greater than a specified weight, and based on a determination that the edge includes the weight that is greater than the specified weight, utilizing the edge to generate the unified insight 132.

An eminence score generator 140 that is executed by the at least one hardware processor (e.g., the hardware processor 2102 of FIG. 21, and/or the hardware processor 2304 of FIG. 23) may generate an eminence score 142 for each unified insight of a plurality of unified insights 112 including the unified insight 132. Further, the eminence score generator 140 may rank each unified insight of the plurality of unified insights according to the eminence scores. The eminence score generator 140 may utilize, as a component of the eminence score 142, a reliability score, a degree of atypicalness, a conciseness score, a naturalness score, and/or a succinctness score.

A robotic agent controller 144 that is executed by the at least one hardware processor (e.g., the hardware processor 2102 of FIG. 21, and/or the hardware processor 2304 of FIG. 23) may control, by the robotic agent 104 and based on the unified insight 132, an operation 146 associated with the robotic agent 104, the object 108, or the environment 110. That is, the robotic agent controller 144 may control, by the robotic agent 104 and based on a highest ranked unified insight, the operation 146 associated with the robotic agent, the object, or the environment.

Figure 2:
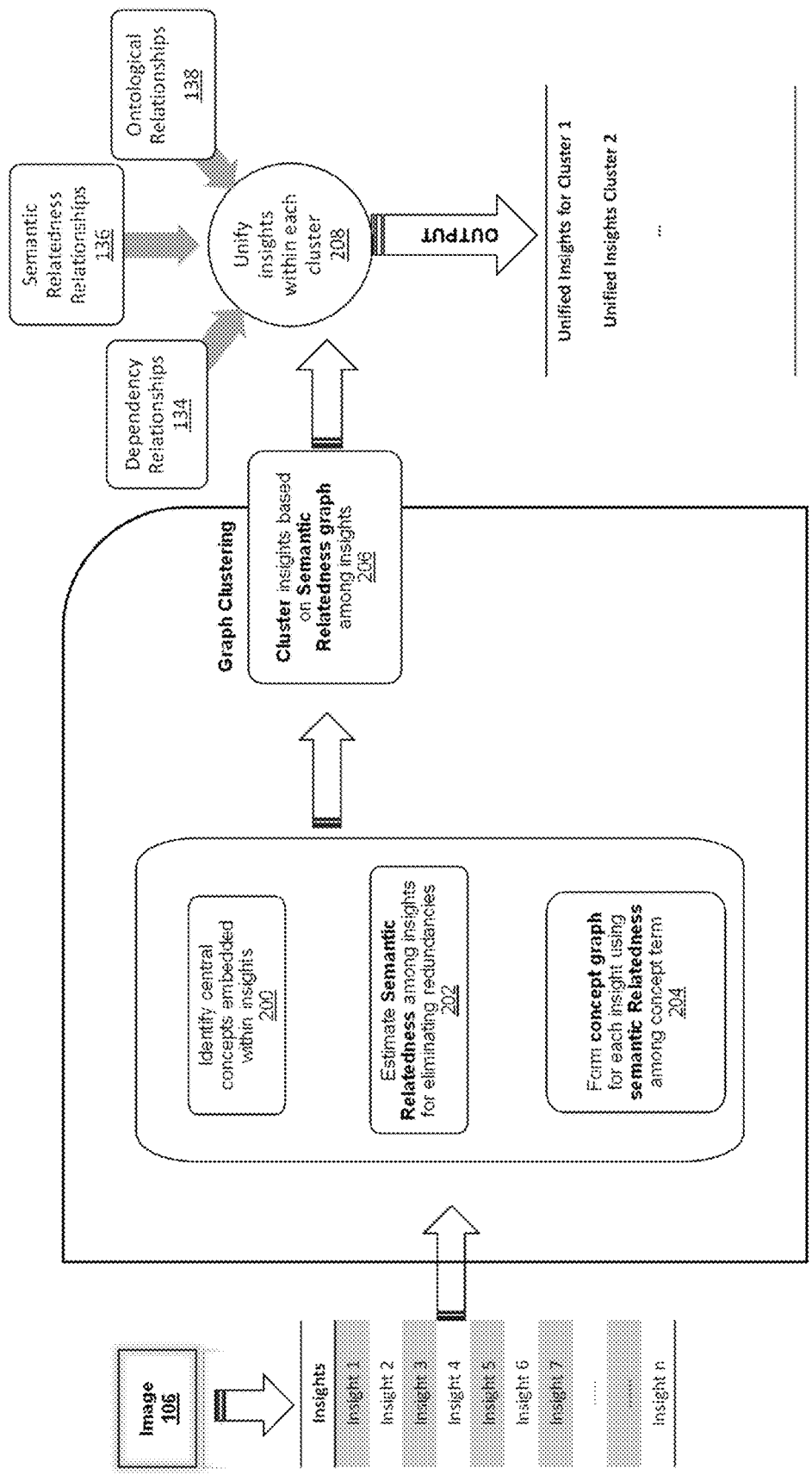
FIG. 2 illustrates a high-level process flow with respect to the natural language unification based robotic agent control apparatus of FIG. 1 in accordance with an example of the present disclosure.

FIG. 2 illustrates a high-level process flow with respect to the apparatus 100 in accordance with an example of the present disclosure.

Inputs

Referring to FIG. 2, the image 106 and a plurality of the insights 112 may be received. In this regard, inputs to the apparatus 100 may include a set of insights (i.e., textual descriptions) about the image 106. An insight may include one or more sentences, and/or a list of words or phrases. Examples of insights may include captions for images or videos, item reviews or feedbacks, social media comments on same event/news, and other such information. With respect to notations, the insights 112 may be represented by Δ. In this regard, |Δ| may denote a number of insights in Δ. Further, syntactic duplicates among insights may be removed before further processing, for example, by using approximate (or fuzzy) string matching techniques.

With respect to the eminence score 142 that may include the reliability score, the degree of atypicalness, and/or the conciseness score, the insights 112 may include at least two insights as inputs. However, with respect to the eminence score 142 that may include the naturalness score, the eminence score 142 that may include the succinctness score, and insight unification, the insights 112 may include at least one insight as input. With respect to insight unification, with one insight as input, the same insight may be returned as output.

The conciseness may provide an indication of how comprehensive yet brief insights are. The succinctness may represent a determination of how brief insights are. The naturalness may determine potentially erroneous or inconsistent insights that include low naturalness scores.

Outputs

Outputs of the apparatus 100 may include unification of insights, which may be output as the unified insight 132. Further, an output of the apparatus 100 may include a control signal to control the operation 146 associated with the robotic agent 104. As the size of the insights set increases, eminence scores may become more effective.

At block 200, the central concepts identifier 122 may identify, as results, central concepts 124 embedded within the plurality of insights 112.

At block 202, the semantic relatedness analyzer 114 may determine the semantic relatedness 116 among insights of the plurality of insights 112 to eliminate redundancies.

At block 204, based on results of the semantic relatedness analyzer 114, a concept graph may be formed for each insight by using semantic relatedness among concept terms.

At block 206, the insights cluster generator 126 may cluster the plurality of insights 112 based on the semantic relatedness graph 120 among the plurality of insights 112.

At block 208, the unified insights generator 130 may receive clustered insights from the insights cluster generator 126, the dependency relationships 134, the semantic relatedness relationships 136, and the ontological relationships 138, and generate, based on the clustered insights from the insights cluster generator 126, the dependency relationships 134, the semantic relatedness relationships 136, and the ontological relationships 138, the unified insights. For example, the unified insights may include a unified insights for cluster 1, a unified insights for cluster 2, etc.

Input Processing

With respect to determination of semantic relatedness by the semantic relatedness analyzer 114, the semantic relatedness analyzer 114 may perform tokenization and stop word removal for the insights 112. In this regard, the semantic relatedness analyzer 114 may extract tokens (e.g., words) from the insights. The semantic relatedness analyzer 114 may perform stop word removal, where stop words may include those words which are to be ignored during analysis. In this regard, a dynamically configurable list of stop words may be generated, or a predefined list of stop words for the language of insights may be used.

The semantic relatedness analyzer 114 may perform term normalization by replacing all equivalent terms with one representative term. For example, term normalization may include language thesaurus based synonym identification and unification (e.g., WORDNET based 'goal' and 'objective'), lemmatization using, for example, language lexicon and morphological analysis (e.g., 'movement' and 'moving' including the same lemma as 'move'), and short-form and long-form unification (e.g., 'IP' and 'Intellectual Property'). With respect to lemmatization, stemming may be utilized prior to lemmatization (e.g., 'trees' being stemmed to 'tree').

The semantic relatedness analyzer 114 may perform concept extraction by identifying potential 'entity-terms' as 'noun-phrases' and 'functionalities' as 'verb-phrases' by applying, for example, POS-TAGGER™ and CHUNKER™. For example, in the sentence "Some trees near to a group of people camping in tents", the identifiable entity terms may include "group of people", 'tents", and "some trees", and the identifiable functionality may include "camping". The semantic relatedness analyzer 114 may utilize phrase mining to extract useful phrases from insights.

Semantic Relatedness

Referring to FIGS. 1 and 2, with respect to semantic relatedness among concepts and insights, the semantic relatedness analyzer 114 may determine vector space representations for words, phrases, and sentences. In this regard, the semantic relatedness analyzer 114 may use word embeddings trained on external text corpuses. For example, an external text corpus may include GLOVE, which may include global vectors for word representation, and may be trained, for example, on WIKIPEDIA, TWITTER, GIGAWORD, etc. Another example of an external text corpus may include WORD2VEC, which includes neural embeddings for word representations, and may be trained, for example, on GOOGLE news corpus.

With respect to semantic relatedness among concepts and insights, the semantic relatedness analyzer 114 may further perform term relevance scoring. The term relevance scoring may represent a term weighing scheme that measures relative relevance of a term with respect to all other terms appearing in the insights 112. Examples of term weighing schemes may include term frequency-inverse document frequency (Tf-Idf), etc. The term weighing schemes may estimate information theoretic weighing for each word with respect to available corpus of insights. In order to perform term relevance scoring, rel(w) may be specified as the weight for word/phrase w, and rel(w) may be specified as:

$$rel(w) = \frac{a}{a + p(w)} \quad \text{Equation (1)}$$

For Equation (1), a may represent an empirical constant (e.g., $10^{-3}$), and p(w) may represent the probability of occurrence of w. Word embedding for each word may be updated as follows:

$$v(w) \leftarrow rel(w) * v(w) \quad \text{Equation (2)}$$

With respect to semantic relatedness among concepts and insights, the semantic relatedness analyzer 114 may further analyze embeddings for concepts and insights. In this regard, for each multi-word term $z=w_1 \ldots w_n$, the semantic relatedness analyzer 114 may generate term embedding as an average of embeddings of the constituent words as follows:

$$v(z) = \text{mean}(v(w_1), \ldots, v(w_n)) = \frac{\sum_{i=1}^{i=n} v(w_i)}{n} \quad \text{Equation (3)}$$

For each insight $f_i \in \Delta$, the semantic relatedness analyzer 114 may populate a list of words in $f_i$ as words($f_i$), and determine the embedding for $f_i$ as a mean vector of its constituent words as follows:

$$v(f_i) = \text{mean}(\text{words}(f_i)) = \frac{\sum_{z \in \text{words}(f_i)} v(z)}{|\text{words}(f_i)|} \quad \text{Equation (4)}$$

For Equation (4), |words($f_i$)| may represent a number of words in $f_i$. With respect to Equation (3) and Equation (4), instead of mean(.), other functions such as min, max, etc., may be used.

With respect to semantic relatedness among concepts and insights, the semantic relatedness analyzer 114 may further perform semantic relatedness estimation for words. In this regard, the semantic relatedness analyzer 114 may specify $v(w_1)$ and $v(w_2)$ to be the embeddings for words $w_1$ and $w_2$, and specify vector space relatedness using these embeddings to be:

$$\text{Rel}_{vec}(w_1, w_2) = \text{Cosine}(v(w_1), v(w_2)) \quad \text{Equation (5)}$$

The semantic relatedness analyzer 114 may specify SemRel$_{WordNet}(w_1, w_2)$ be the semantic relatedness estimation based, for example, upon an ontology, such as WORDNET. The semantic relatedness analyzer 114 may apply, for example, Lin measure, which provides normalized scores (i.e., in the range [0,1]), to estimate SemRel$_{WordNet}(w_1, w_2)$. Thus, the semantic relatedness score between $w_1$ and $w_2$ may be specified as follows:

$$\text{SemRel}(w_1, w_2) = \max\{\text{Rel}_{vec}(w_1, w_2), \text{SemRel}_{WordNet}(w_1, w_2)\} \quad \text{Equation (6)}$$

With respect to semantic relatedness among concepts and insights, the semantic relatedness analyzer 114 may further perform semantic relatedness estimation for multi-word text elements. In this regard, the semantic relatedness analyzer 114 may specify $X_1$ and $X_2$ to be multi-word text elements, phrases (e.g., concepts), and insights. The semantic relatedness analyzer 114 may specify Words($X_1$)=$w_{11}, \ldots w_{1N}$ and Words($X_2$)=$w_{21}, \ldots w_{2M}$ to be the lists of words in $X_1$ and $X_2$. For each pair of words $(w_{1x}, w_{2y}) \in X_1 \times X_2$, the semantic relatedness analyzer 114 may estimate the semantic relatedness score as described above. The semantic relatedness score between $X_1$ and $X_2$ may be defined as follows:

$$\text{SemRel}(X_1, X_2) = \frac{1}{M+N} \left( \sum_{w_{1x}} \max_{w_{2y}}(\text{SemRel}(w_{1x}, w_{2y})) + \sum_{w_{2y}} \max_{w_{1x}}(\text{SemRel}(w_{2y}, w_{1x})) \right) \quad \text{Equation (7)}$$

For Equation (7), M and N may be described as the number of words occurring in $X_1$ and $X_2$, respectively.

In some examples, the semantic relatedness analyzer 114 may perform joining of all the tokens in "entity terms" and "functional terms" using special character such as "_", and replace those in the input corpus. For example, "this XYZ non-interventional study report" may be converted to "this_XYZ_non_-interventional_study_report".

In some examples, the semantic relatedness analyzer 114 may generate term embeddings. For example, since the number of insights for an image may be relatively small in number (e.g., less than $10^3$ sentences), the semantic relatedness analyzer 114 may use word embeddings trained on external text corpuses. Examples of external text corpuses may include Global Vectors for Word Representation (GloVe), which may be trained on WIKIPEDIA™, TWITTER™, GIGAWORD™, etc. Other examples of external text corpuses may include Word2Vec (Neural embeddings for word representations), which may be trained on GOOGLE NEWS CORPUS™.

In some examples, since externally trained word embeddings may be used, direct embeddings may not be needed for entity and action terms. In such a case, the semantic relatedness analyzer 114 may determine (e.g., by estimating) information theoretic weighing for each term with respect to the available corpus of insights using, for example, BM25 for each word in the corpus (e.g., let $w_{bm25}$ be the weight for word w). For each word embedding:

$$v(w) \leftarrow w_{bm25} * v(w) \quad \text{Equation (8)}$$

For each multi-word term $z=w_1$ the semantic relatedness analyzer 114 may generate term embedding by summing embeddings of constituent words as follows:

$$v(z) \leftarrow \sum_{i=1}^{i=n} v(w_i) \quad \text{Equation (9)}$$

In some examples, in order to represent insights into embedding space, with $f_i$ being the $i^{th}$ insight for the image under consideration, the semantic relatedness analyzer 114 may populate a list of entity terms in $f_i$ as entity($f_i$), and populate a list of action terms in $f_{app}$ as action($f_i$). Further, with the remaining words in $f_i$ being wd($f_i$), the semantic relatedness analyzer 114 may estimate embedding for $f_i$ as:

$$v(f_i) = [v(\text{entity}(f_i)), v(\text{action}(f_i)), v(wd(f_i))] \quad \text{Equation (10)}$$

For Equation (10):

$$v(\text{entity}(f_i)) = \sum_{z \in \text{entity}(f_i)} v(z)$$

$$v(\text{action}(f_i)) = \sum_{z \in \text{action}(f_i)} v(z)$$

$$v(wd(f_i)) = \sum_{w \in wd(f_i)} v(w)$$

In some examples, the semantic relatedness analyzer 114 may the determined relatedness as follows, for example, with respect to different insights that include insight #1, insight #2, and insight #3:

| Insight #1 | Insight #2 | Insight #3 |
|---|---|---|
| v(bd$_{App1}$) | v(dd$_{App2}$) | rel (v(bd$_{App1}$), v(bd$_{App2}$)) |

The rel( ) function may be specified as follows:
For two triplets of embedding vectors $[X_{1e}, X_{1a}, X_{1w}]$, $[X_{2e}, X_{2a}, X_{2w}]$ $$\text{rel}([X_{1e}, X_{1a}, X_{1w}], [X_{2e}, X_{2a}, X_{2w}]) = [m(X_{1e}, X_{2e}), m(X_{1a}, X_{2a}), m(X_{1w}, X_{2w})] m(.,.) = \max\{\text{Cosine}(.,.), \text{WordMover}(.,.)\}$$

Eminence Scores

Referring to FIGS. 1 and 2, with respect to eminence scores, the eminence score generator 140 may generate the eminence score 142 for each unified insight 132, if there are a plurality of unified insights.

In order to generate the eminence score 142, the eminence score generator 140 may utilize, as a component of the eminence score 142, the reliability score. With respect to the reliability score, for each insight I in Δ, the eminence score generator 140 may set reliability(I)=0. If (|Δ|>1), as disclosed herein, semantic relatedness may be determined between each pair of insights in Δ (e.g., see discussion above with respect to semantic relatedness estimation for multi-word text elements). The eminence score generator 140 may perform the following operation:

$$\text{For each } (I_i, I_{j \neq i}) \in \Delta \times \Delta: w_{ij} = \text{SemRel}(I_i, I_j) \quad \text{Equation (11)}$$

The eminence score generator 140 may generate an undirected weighted graph $G_\Delta$ (i.e., a semantic relatedness graph) with nodes representing insights, and semantic relatedness scores being used as weights associated with edges. In this regard, the eminence score generator 140 may specify node $n_I$ to represent insight I. For each node in $G_\Delta$, the eminence score generator 140 may determine the node's centrality score (by applying a node centrality technique, such as degree centrality, which is the average of all edge weights from a node, for weighted networks. The eminence score generator 140 may further specify that for each insight I∈Δ: reliability(I)=centrality($n_I$).

The eminence score generator 140 may interpret reliability scores, where individual reliability scores may indicate a degree to which an insight has information/concepts that are supported by other insights. In this regard, with respect to variability in reliability scores, a high variation across insights may indicate that the underlying object of discussion (e.g., image) is potentially complex and consists of many semantically weakly related (or less known) aspects. Further, a lower variation may imply that either the underlying object of discussion is relatively simple or is well known.

The eminence score generator 140 may utilize, as a component of the eminence score 142, the degree of atypicalness. With respect to the degree of atypicalness, for each insight I in Δ, the eminence score generator 140 may set atypicalness(I)=0. The eminence score generator 140 may specify words(I)=set of words appearing in insight I. The eminence score generator 140 may specify that words (I)=$\cup_{I \in \Delta}$ words(I) be the set of words across all insights (e.g., as disclosed herein with respect to term normalization of equivalent words). The semantic relatedness scores between each pair words may be determined as disclosed herein with respect to semantic relatedness estimation for words, and further as follows:

for each $(w_i, w_{j \neq i}) \in \text{words}(\Delta) \times \text{words}(\Delta)$:

$$\delta_{ij} = \text{SemRel}(w_i, w_j) \quad \text{Equation (12)}$$

For Equation (12), $\epsilon \in [0,1]$ may represent a constant for setting a lower threshold on atypicalness of words (where a default may be set to 0.5).

The eminence score generator 140 may determine the degree of a typicalness (e.g., an atypical-ness score) of insight I∈Δ as follows:

$$\text{atypicalness}(I) = \Sigma_{w \in I}\{\text{atypicalness}(w) > \epsilon\} \quad \text{Equation (13)}$$

For Equation (13), $$\text{atypicalness}(w) = 1 - (\text{avgConceptRel}(w) * \text{Nor}(iif(w))) \quad \text{Equation (14)}$$

$$\text{avgConceptRel}(w) = \text{mean}_{w' \neq w \in \text{words}(\Delta)}\{\text{SemRel}(w, w')\} \quad \text{Equation (15)}$$

$$iif(w) = |\Delta| / \text{no of insights where } w \text{ appears} \quad \text{Equation (16)}$$

$$\text{Nor}(iif(w)) = \frac{iif(w) - \min_{w \in \text{words}(\Delta)}(iif(w))}{\max_{w \in \text{words}(\Delta)}(iif(w)) - \min_{w \in \text{words}(\Delta)}(iif(w))} \quad \text{Equation (17)}$$

The eminence score generator 140 may determine a sum of atypicalness scores of highly atypical words in an insight. Based on the analysis with respect to Equation (12)-Equation (17), the eminence score generator 140 may identify the atypical terms for each insight.

With respect to interpretation of atypicalness scores (e.g., the degree of atypicalness), individual atypicalness scores may indicate a degree to which an insight is odd-one-out in the insight set. As compared to other insights, the atypicalness score may capture to what extent a current insight contains concepts which are semantically weakly related with most other concepts across insights. Furthermore, insights which are represented in a unique way may include higher scores in an atypicalness scale. With respect to variability in atypicalness scores, high variation across insights may indicate that the underlying object of discussion (e.g., image) is observed to be associated with different types of aspects. Lower variation on the other hand may imply that if most of the insights have low atypicalness scores, the underlying object of discussion may be associated with relatively well known aspects. If most of the insights have high atypicalness scores, the underlying object of discussion may be associated with aspects which can be described in different ways.

The eminence score generator 140 may utilize, as a component of the eminence score 142, the conciseness score. With respect to the conciseness score, the eminence score generator 140 may estimate conciseness by measuring how complete yet brief an insight is. The eminence score generator 140 may generate a global concept graph $G_{\text{words}(\Delta)}$ for which nodes may represent concepts extracted from insights, and edge weights may represent semantic relatedness scores between concepts (as disclosed herein with respect to semantic relatedness estimation for words). The eminence score generator 140 may merge semantically equivalent nodes in $G_{\text{words}(\Delta)}$ by retaining only those edges in $G_{\text{words}(\Delta)}$ that include a weight greater than d (e.g., 0.85). Further, the eminence score generator 140 may collect all the nodes which are part of the same connected component in one group, resulting in partition of a set of concepts into very similar concepts that are brought together in the same group ($X_p$ may represent the list of these groups). Further, the eminence score generator 140 may specify r as the number of total groups resulting from this process (e.g., the count of total number of semantically unique concepts across all insights).

With respect to conciseness estimation, for each insight (I∈Δ) the eminence score generator 140 may specify $i_c$ as the total number of concept occurrences in I (repetitions of concepts may be counted as many times as they occur in the insight). The eminence score generator 140 may specify i as the total number of groups in $X_p$, which are spanned by the concepts in I (e.g., to count unique concepts present in the insight I). The eminence score generator 140 may determine the conciseness score for an insight I as follows:

$$\text{conciseness}(I) = \frac{i_u}{r} * \frac{i_u}{i_c} \quad \text{Equation (18)}$$

For Equation (18), $$\frac{i_u}{r}$$

may measure relative completeness, and $$\frac{i_u}{i_c}$$

may measure degree of brevity (i.e., lack of redundancy).

With respect to interpretation of conciseness scores, individual conciseness scores may indicate the degree to which an insight can be considered relatively complete. Higher conciseness scores (e.g., closer to 1) may indicate that the insight has low semantic redundancy among its descriptions, and the insight describes most of the aspects of the underlying object of discussion as compared to other insights. Lower conciseness scores may indicate that either the insight has high redundancy in its descriptions, or the insight is missing many of the aspects of the underlying object of discussion which are described in some other insights.

With respect to variability in conciseness scores, high variation across insights may provide an indication on the nature of the insight set and the underlying sources. There may be insights with high scores that may be received from sources for which the underlying object of discussion may be associated with concepts which are relatively more familiar (e.g., included in the training set for the underlying machine learning model), and also there are insights with lower conciseness scores that may be received from those sources which do not have the means to identify, infer, and/or analyze concepts associated with the underlying object of discussion. Alternatively, lower variation across insights may imply that most of the insights are received from technically similarly effective sources with respect to the concepts which are associated with the underlying object of discussion.

The eminence score generator 140 may utilize, as a component of the eminence score 142, the naturalness score. With respect to the naturalness score, for each insight, the eminence score generator 140 may determine semantic relatedness between each pair of words appearing within the insight (e.g., as disclosed herein with respect to semantic relatedness estimation for words). The determination of semantic relatedness between each pair of words may be used to determine an intrinsic semantic relatedness graph (ISG) for each insight, where nodes may represent words, and semantic relatedness scores may represent edge weights. The eminence score generator 140 may determine expected semantic relatedness (referred to as the intrinsic semantic consistency (ISC) score) between any random pair of nodes in the intrinsic semantic relatedness graph as an average of semantic relatedness scores across a pair of nodes in the intrinsic semantic relatedness graph. The eminence score generator 140 may then determine the likelihood score of all part-of-speech (POS) trigrams within each insight. With respect to the POS trigrams, for the sentence "some trees near to a group of people camping in tents", POS tagging may result into "some/DT trees/NNS near/IN to/TO a/DT group/NN of/IN people/NNS camping/VBG in/IN tents/NNS", where the POS trigrams are {DT, NNS, IN}, {NNS, IN, TO}, {IN, TO, DT}, . . . , {VBG, IN, NNS}. The likelihood score of a trigram may represent the probability of these POS tags occurring together in a given order based upon the evidence present in a generic language model, such as WIKIPEDIA. These likelihoods may represent measures with respect to a part-of-speech trigram model generated using a generic language corpus (e.g., WIKIPEDIA). The eminence score generator 140 may determine the part-of-speech score for the insight as the mean likelihood score across all trigrams in the insight. Further, the eminence score generator 140 may determine the naturalness score as an average of intrinsic semantic consistency score and the part-of-speech score.

With respect to interpretation of the naturalness score, the naturalness score may indicate the degree to which an insight consists of terms which are strongly semantically related with one another (e.g., as captured by word embeddings trained on global knowledge bases). The naturalness score may also indicate how people or other intelligent agents (familiar with similar objects) are going to describe the object under observation in the same way as the current insight describes the object. A higher score may indicate that the insight includes most of the semantically strongly relevant concepts and has low redundancy among concepts contained in the insight. A lower score may indicate that the insight is describing those aspects of the underlying object of discussion, which are not so well related.

With respect to variability in the naturalness score, high variation across insights may provide an indication that the underlying object of discussion (e.g., image) consists of multiple aspects, some of which are related with one another at various levels, while others are not found to be so closely related. Alternatively, lower variation may imply that either the underlying object of discussion is associated with most of the aspects which are naturally known to be together, or most of the objects are unrelated to one another.

The eminence score generator 140 may utilize, as a component of the eminence score 142, the succinctness score. With respect to the succinctness score, succinctness may measure how much to-the-point insights are. In order to determine succinctness, the eminence score generator 140 may determine two inter-related sub measures. Intrinsic succinctness may measure the degree to which an insight contains terms with minimum necessary details. Relative succinct may measure the degree to which an insight describes concepts using terms at higher levels of abstractions when compared with other insights describing same concept.

With respect to determination of intrinsic succinctness, for each insight I, the eminence score generator 140 may determine an intrinsic succinctness score as follows. The eminence score generator 140 may collect noun type words (with part of speech tags as NN (noun, singular or mass), NNS (noun, plural), NNP (proper noun, singular), NNPS (proper noun, plural), etc. In the dependency tree of I, the eminence score generator 140 may count dependent nodes for these noun type words. The intrinsic succinctness score of insight I may be determined as follows:

$$ISS(I) = \frac{\text{number of noun type words}}{\text{number of noun type words} + \text{number of their dependents}}$$ Equation (19)

Equation (19) may imply that intrinsic succinctness of an insight is high if entity terms appearing in the insight contain less further information. For example, if insight-1 indicates that "A boy in red shirt and green shorts is playing with colorful ball," and insight-2 indicates that "A boy is playing with a ball," insight-2 may be determined to be more succinct than insight-1 since insight-1 has additional details (e.g., "red shirt and green shorts" and "colorful") reducing its succinctness.

With respect to determination of relative succinctness, the eminence score generator 140 may specify $c_1$, $c_2$ as the concepts appearing in the insights. The eminence score generator 140 may specify that AbsLevelDiff($c_1$, $c_2$)=r if concept $c_1$ is r levels above concept $c_2$ in the hyponymy hierarchy as per the WORDNET (a default may be set to zero). A number of concepts in the first sight $I_1$ that are at higher levels (e.g., more abstract) than concepts appearing in the second insight $I_2$ may be determined as follows:

AbsLevelDiff($I_1,I_2$)=$\Sigma_{c_1 \in I_1, c_2 \in I_2}$AbsLevelDiff($c_1 c_2$)   Equation (20)

For each insight I∈Δ, the eminence score generator 140 may determine the following:

$$RSS(I) = \frac{\Sigma_{I' \neq I \in \Delta} AbsLevelDiff(I, I')}{\text{Number of concepts in } I}$$ Equation (21)

The eminence score generator 140 may normalize Δ(.) scores to the [0,1] range by applying a min-max procedure. The eminence score generator 140 may combine ISS(.) and RSS(.) to determine the degree of succinctness of each insight as follows:

succinctness(I)=α*ISS(1)+(1−α)*RSS(1);α∈[0,1]   Equation (22)

For Equation (22), a may represent a numeric parameter that may be configured externally in the range of 0 and 1 (with a default value, for example, of 0.5).

With respect to interpretation of succinctness scores, a higher succinctness score on a succinctness scale may indicate that the insight describes concepts at relatively higher levels of abstraction as compared to other insights, while using the minimum necessary details with terms. With respect to variability in succinctness scores, a high variation across insights may indicate that there are concepts associated with the underlying object of observation, which are being described at varying levels of abstractions and that different amounts of details are being given for concepts in different insights. This may mean that underlying sources of insights have very different technical foundations (e.g., learning model, training data, etc.), which is leading to such variations. A lower variation may imply that the underlying object of observation is associated with concepts which have relatively standard ways to describe them, and that sources of insights are behaviorally equivalent as far as their capability to generate expressions to convey these concept is of concern.

For the eminence score 142, the individual scores that include the reliability score, the degree of atypicalness, the conciseness score, the naturalness score, and/or the succinctness score may be totaled. Alternatively, the individual scores that include the reliability score, the degree of atypicalness, the conciseness score, the naturalness score, and/or the succinctness score may be normalized with respect to each other, and then a total eminence score 142 may be determined to rank a plurality of unified insights as disclosed herein.

Insight Unification

Referring to FIGS. 1 and 2, with respect to insight unification, the unified insights generator 130 may receive clustered insights from the insights cluster generator 126, dependency relationships 134, semantic relatedness relationships 136, and ontological relationships 138, and generate, based on the clustered insights from the insights cluster generator 126, the dependency relationships 134, the semantic relatedness relationships 136, and the ontological relationships 138, the unified insights (e.g., a unified insight 132 for each insights cluster 128 of a plurality of insights clusters).

In order to generate the unified insights, the unified insights generator 130 may unify semantically coherent groups of insights. In this regard, the semantic relatedness analyzer 114 may generate the semantic relatedness graph 120, designated as $G_{insights}$, across insights, where nodes may represent insights and semantic relatedness scores between a pair of insights may represent edge weights. The unified insights generator 130 may select a clustering threshold δ∈[0,1] (where a default value may be set to 0.7). The unified insights generator 130 may delete all of the edges in $G_{insights}$ having edge weights less than δ. The unified insights generator 130 may apply graph clustering techniques such as maximum flow/minimum cut, spectral clustering, etc.) to generate clusters of nodes (e.g., no two clusters should share nodes) such that each cluster may represent semantically coherent groups of insights. For example, the unified insights generator 130 may identify connected components in $G_{insights}$, where each connected component represents a cluster. The unified insights generator 130 may unify insights within each cluster (as disclosed herein) into a smaller number of insights. The unified insights generator 130 may treat unified insights across clusters as new set of insights, and determine various eminence scores for these unified insights to make selections.

With respect to insight unification, from each insight, the unified insights generator 130 may extract SPO (subject-predicate-object) tuples as follows. The unified insights generator 130 may generate dependency parse trees for the insights. For each verb, the unified insights generator 130 may identify associated dependent subject(s) and objects to form one SPO tuple. The SPO tuple may be extended with a determiner and adjectives associated with the subject and objects. The unified insights generator 130 may select the insight within the cluster having the highest number of concept terms as the base insight, and expand the base insight during unification. The unified insights generator 130 may specify C={($S_1$, $P_1$, $O_1$), ($S_2$, $P_2$, $O_2$), . . . , ($S_k$, $P_k$, $O_k$)} to be the list of SPO tuples across insights within a cluster. The semantic relatedness analyzer 114 may generate the semantic relatedness graph 120 among predicates of all SPO tuples in C. The unified insights generator 130 may specify $G_C=(N_C, E_C, w_C)$ to be the semantic relatedness graph among predicates, where:

$N_c = \{n_{P_1}, n_{P_2}, \ldots, n_{P_k}\}$, $E_C \subseteq N_C \times N_C$ and $w_C : E_C \mapsto [0,1]$ such that for all $e = (n_{P_i}, n_{P_j}) \in E_C$:

$$w_C(e) = \text{semantic relatedness score between} P_i \text{ and } P_j \quad \text{Equation (23)}$$

For Equation (23), $N_C$ may represent the set of nodes—for each predicate $P_1, \ldots, P_k$, there is a node $n_{P_1}, \ldots, n_{P_k}$, and $E_C$ may represent edges denoting semantic relatedness between pair of predicates. If an edge has weight less than $\epsilon_{diff} \in [0,1]$ (where a default may be set to 0.5), the unified insights generator 130 may remove that edge from $E_C$ (e.g., not consider a pair of activities that are semantically unrelated for unification). The unified insights generator 130 may identify all those edges having weights greater than $\epsilon_{dup} \in (0.5, 1]$ (where a default may be set to 0.85, e.g., when activities may be considered semantically very close). For each edge $e = (n_{P_i}, n_{P_j}) \in E_C$, the unified insights generator 130 may specify $(S_i, P_i, O_j)$ and $(S_i, P_i, O_j)$ be the corresponding SPO tuples. The unified insights generator 130 may merge the SPO tuples by combining $S_t$ and $S_i$, $O_i$ and $O_j$ and selecting only one of $P_i$ and $P_j$.

With respect to insight unification, the unified insights generator 130 may extract all of the activities and predicates from the insights to be merged (e.g., insights within a cluster). The unified insights generator 130 may use natural language processing for part-of-speech tagging or dependency parsing to identify activities as verb phrases. The unified insights generator 130 may identify a base insight in the cluster based on a maximum number of concepts (or noun phrases) present in the cluster (the base insight may be specified as Ix). The unified insights generator 130 may use natural language processing for shallow parsing or chunking to identify noun phrases. The unified insights generator 130 may iteratively merge insights (specified as Iy) in the cluster within Ix. In this regard, the unified insights generator 130 may generate pairs of activities $L = [\ldots (Ax, Ay) \ldots]$ such that activity Ax belongs to Ix, activity Ay belongs to Iy, and $Rel(Ax, Ay) \geq \epsilon_{rel}$ such that $\epsilon_{rel} \in (0.9, 1]$ (where a default $\epsilon_{rel} = 0.9$). In this regard, $$Rel(Ax, Ay) = \max_i Rel(A_i, A_y),$$

where Ay is most related to Ax, and this relatedness is above a specified threshold.

With respect to insight unification, if L is non-empty, for each activity pair [Ax, Ay], the unified insights generator 130 may extract an SPO tuple, (Sx, Ax, Ox) and (Sy, Ay, Oy) associated with Ax and Ay in Ix and Iy respectively, where Sx and Sy may represent subjects, and Ox and Oy may represent objects. If it is not possible to extract an SPO tuple because a verb is modifying a noun, and instead an 'acl' tuple is obtained, the unified insights generator 130 may change 'acl' to 'nsubj', and reverse the dependency direction such that noun becomes subject modifier of verb, where 'acl' may refer to a relationship between a noun (which is getting modified) and a dependent clause (which is modifying the noun), and 'nsubj' may refer to a relationship between a noun and a clause, where the noun is the primary subject or agent which is executing the action specified by the clause. For example, for the insight "A man is attempting to surf down a hill made of sand on a sunny day", noun 'hill' is being modified by 'made' and represented as ((hill, 'NN'), 'acl', (made, 'VB')). The unified insights generator 130 may change 'acl' to 'nsubj' as follows: (('made', 'VBN'), 'nsubj', ('hill', 'NN')). If relatedness between subjects Sx and Sy, or relatedness between objects Ox and Oy is greater than $\epsilon_{rel}$, as disclosed herein, the unified insights generator 130 may modify the base description (or insight) Ix, for activities Ax and Ay. If relatedness between subjects sx and sy is greater than $\epsilon_{rel}$, as disclosed herein, the unified insights generator 130 may modify the subject pair (sx, sy). Further, as disclosed herein, the unified insights generator 130 may unify details for sx and sy. If relatedness between objects ox and oy is greater than $\epsilon_{rel}$, as disclosed herein, the unified insights generator 130 may modify the similar object pair (ox, oy). Further, as disclosed herein, the unified insights generator 130 may unify details for ox and oy.

With respect to insight unification, as disclosed above, under certain circumstances, the unified insights generator 130 may unify details for sx and sy, or for ox and oy. In this regard, given pair (P, Q) such that P is in base insight Ix and Q is in the insight to be merged (e.g., Iy), the unified insights generator 130 may unify details for (P, Q) as follows. From the dependency parse trees for Ix and Iy, the unified insights generator 130 may specify lists of terms related to P and Q as modifiers using dependency relation R as: mod P=[m1, m2, ..., mp] for P, and mod Q=[n1, n2, ..., nq] for Q, where R={amod (adjective modifier), num-mod (number modifier) or det(determiner modifier), nmod (noun modifier), adv-mod(adverbial modifier)}, where m1, ... mp may refer to terms which are related to P using any of the relations referred by R. Similarly, n1 ... nq may refer to the terms which are related to Q using any of the relations referred by R. A special case may arise when a non-verb type term is modifying a noun using relation R as 'acl'. For example, "a man in green kick a soccer ball while a man in purple and white is falling down". In this regard, the noun 'man' is being modified by the adjective 'green' and may be represented as—(('man', 'NN'), ('green', 'JJ')). In this case, the unified insights generator 130 may change 'acl' to 'nmod' so that non-noun term becomes adjective type for the modified noun (e.g., (('man', 'NN'), 'nmod', ('green', 'JJ'))).

With respect to insight unification, when there are no modifiers for P (from the base insight), then the unified insights generator 130 may add modifiers of Q (from the insight to be merged) to P (in the same way as they appear for Q). For example, for the phrases "a bird" from Ix and "a black fowl" from Iy, for relation R='amod', this results in P='bird', Q='fowl' and mod P=[ ], mod Q=['black']. After performance of unification by the unified insights generator 130, the results may include "a bird"+"a black fowl"="a black bird".

With respect to insight unification, when lists of modifiers for P (from the base insight) and Q (from the insight to be merged) are non-empty, if both Mx and My are non-empty, then the unified insights generator 130 may generate lists of modifier-pairs as $Rm = [\ldots (mi, nj) \ldots]$, such that modifier mi belongs to modP and modifier nj belongs to modQ, and either of following conditions (1 OR 2) are true. For condition 1, $Rel(mi, nj) \geq \epsilon_{sim}$ where Rel(mi, nj) may represent the maximum of the pairwise relatedness among pairs $(m_\alpha, n_j)$ (e.g., mi is most related to mj as compared to other modifiers $m_\alpha$ in My). For condition 2, mi and nj may be related via ontological relations 'hypernym' or 'hyponym'. In this regard, language ontologies such as WORDNET may be used to determine such relation-ships. For example (vehicle, car), where vehicle is hypernym(super class) of car.

With respect to insight unification, for those modifiers in modQ of Q in Iy, for which there does not exist any modifier of P in modP such that either of the above conditions (e.g., condition 1 and condition 2) are true, the unified insights generator 130 may extend such modifiers as modifier of P in Ix in the same order as they appear for Q in Iy (similar to when there are no modifiers for P (from base insight), and modifiers of Q are added (from insight to be merged) to P). For example, for the phrases "a new car" and "a race car", for relation R='nmod', mi="new", nj="race", and after unification, the result is "a new race car". For each pair (mi, nj) in Rm, the unified insights generator 130 may modify Ix as disclosed herein.

With respect to insight unification, as disclosed herein, for each pair (mi, nj) in Rm, the unified insights generator 130 may modify Ix. In this regard, the unified insights generator 130 may modify base insight Ix for modifier mxi, myj and relation type R. For relation type R as 'amod' (e.g., adjective modifier) or 'adv-mod' (e.g., adverbial modifier), if mi is hypernym of nj then, the unified insights generator 130 may replace term mi in Ix with phrase "nj or mi". Alternatively, if mi is hyponym of nj, then the unified insights generator 130 may replace term mi in Ix with phrase "mi or nj". Alternatively, the unified insights generator 130 may replace mi in Ix with phrase "mi and nj". For example, "a colorful kite"+"red kite"="a red or colorful kite" (since colorful is hypernym of red). According to another example, "a pink kite"+"red kite"="a red and pink kite".

With respect to insight unification, for relation type R as 'nmod' (e.g., noun modifier), if mi is hypernym of nj, then the unified insights generator 130 may replace mi with nj and unify modifiers of nj with modifiers of mi. Alternatively, if mi is hyponym of nj, then the unified insights generator 130 may only unify modifiers of nj with modifiers of mi (e.g., as disclosed herein with respect to unification for (P, Q), for a pair (P, Q) such that P is in base insight Ix and Q in insight to be merged). Alternatively, the unified insights generator 130 may replace mi in Ix with phrase "mi and nj" and unify modifiers of nj to modifiers of mi (e.g., as disclosed herein with respect to unification for (P, Q), for a pair (P, Q) such that P is in base insight Ix and Q in insight to be merged). For example, "a group of players"+"a team of players"="a team of players", where P=Q="players", mi="group", and nj="team". For relation type R as nummod and det (e.g., number modifier), if mi is determiner type, and nj is number type, then the unified insights generator 130 may replace mi in Ix with nj. Alternatively, if mi and nj both are of number type, then the unified insights generator 130 may replace mi in Ix with phrase "mi or nj". If none of these conditions is met, then the unified insights generator 130 may perform no action with respect to mi in Ix. For example, "Some men"+"Five men"="Five Men", where P=Q=Then', mi="some" and nj="five".

With respect to insight unification, as disclosed herein with respect to modification of base description (or insight) Ix, for activities Ax and Ay, for activities, if activity Ax is hypernym of activity Ay, then the unified insights generator 130 may replace Ax with Ay, and otherwise, no action may be performed. For example, for Ax="relaxing" and Ay="sleeping", after unification, the unified insights generator 130 may determine that Ax="sleeping".

With respect to insight unification, as disclosed herein with respect to modification of related subject pair (sx, sy), and modification of related object pair (ox, oy), for subjects or predicates, if sx is a hypernym of sy then, the unified insights generator 130 may replace "sx" with "sy", and otherwise, no action may be performed. For example, for sx="animal" and sy="dog", after unification, the unified insights generator 130 may determine that sx="dog". If ox is hypernym of oy then, the unified insights generator 130 may replace "ox" with "oy", and otherwise, no action may be performed. For example, for ox="ball" and oy="football", after unification, the unified insights generator 130 may determine that ox="football".

Figure 19:
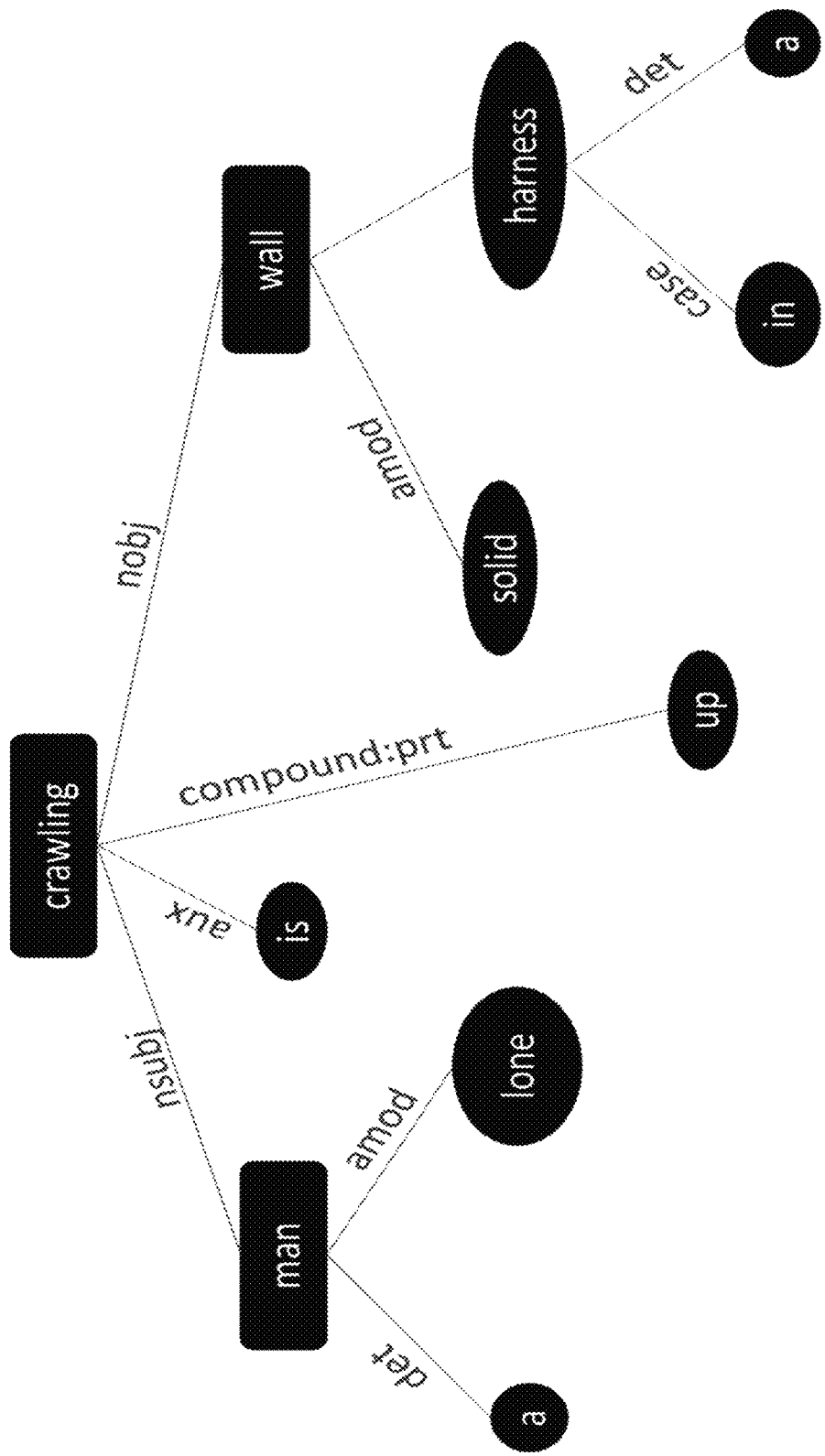
FIG. 19 illustrates insight unification to illustrate operation of the natural language unification based robotic agent control apparatus of FIG. 1 in accordance with an example of the present disclosure.
Figure 20:
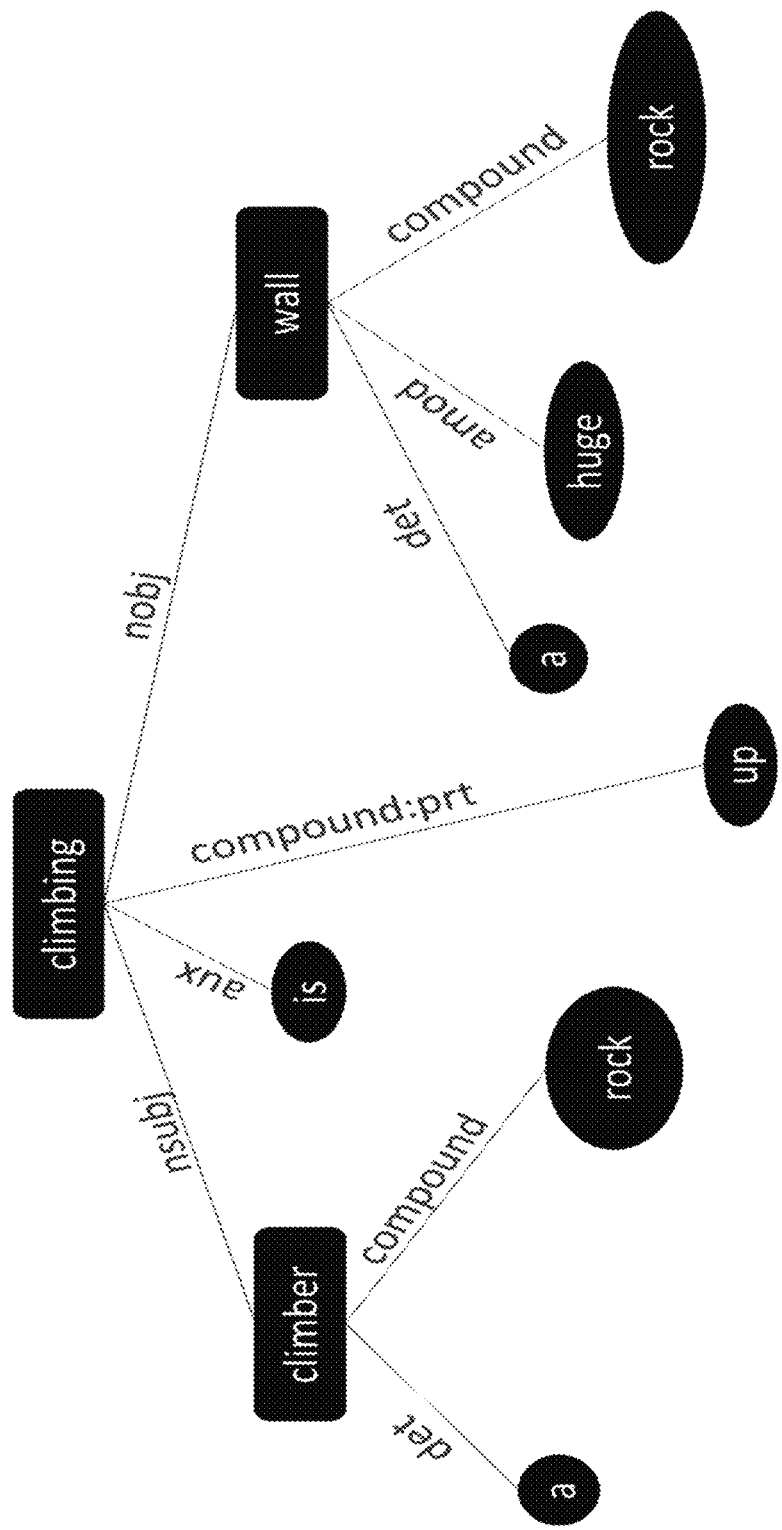
FIG. 20 illustrates insight unification to illustrate operation of the natural language unification based robotic agent control apparatus of FIG. 1 in accordance with an example of the present disclosure.

FIGS. 19 and 20 illustrate insight unification to illustrate operation of the apparatus 100 in accordance with an example of the present disclosure.

Referring to FIGS. 19 and 20, for Ix="A lone man is crawling up a solid wall in a harness" and Iy="A rock climber is climbing up a huge rock wall", the unified insights generator 130 may unify insights Ix and Iy to generate "A lone rock climber is climbing up a huge and solid rock wall in a harness." The dependency tree for Ix is shown in FIG. 19. Further, the dependency tree for Iy is shown in FIG. 20.

With respect to insight unification, compound relationships may be treated as phrases. For example, with respect to FIGS. 19 and 20, the predicate in Ix and Iy (Px, Py)= (crawling up, climbing up). Since crawling up is more specific than climbing up (is established using hypernymy/ hyponymy), the unified insights generator 130 may unify these as climbing in Ix (e.g., as disclosed herein with respect to unification for activities). From the dependency parse tree, the subject pairs (sx, sy) may include (man, rock climber). In this regard, since rock climber is more specific to man (is established using hypernymy/hyponymy), the unified insights generator 130 may unify these as rock climber in Ix (e.g., as disclosed herein with respect to unification for subjects or predicates). For the example of FIGS. 19 and 20, the relation type R may be determined to be nmod, the modifier to "man" in Ix may be determined to be Mx=['lone'], the modifier to "climber" in Iy may be determined to be My=[ ], since My is empty, no change may be made, and Ix may become "A lone rock climber is climbing up a solid wall in a harness."

With respect to FIGS. 19 and 20, object pair (ox, oy) may be specified as (wall, rock wall). Since 'rock wall' is more specific than wall (is established using hypernymy/hyponymy), the unified insights generator 130 may unify these as rock wall in Ix (e.g., as disclosed herein with respect to unification for subjects or predicates). For the example of FIGS. 19 and 20, the relation type R may be determined to be amod, for ox, Mx=['huge'], for oy, My=['solid'], and these may be unified as "huge and solid" (e.g., as disclosed herein with respect to modification of base insight Ix for modifier mxi, myj, and relation type R). The final unified insight may be specified as "A lone rock climber is climbing up a huge and solid rock wall in a harness."

With respect to naturalness of a merged insight, the extent to which a merged insight would appear natural to human users as compared to original insights which were used to generate the merged insight may be measured. In this regard, the eminence score generator 140 may specify a merged insight to be $M_X$=merge(X) for a cluster of semantically closely related insights $X=\{I_1, \ldots I_n\}$, where $I_1, \ldots I_n$ are insights. Further, the eminence score generator 140 may specify $c_a$ to be the average of the likelihoods of all part of speech (POS) trigrams in the insight $I_a$ with respect to a part of speech trigram model generated, for example, using a generic language corpus (e.g., WIKIPEDIA). The eminence score generator 140 may specify $c_M$ to be the average of the likelihoods of part of speech trigrams in the merged insight $M_X$. The eminence score generator 140 may determine the following:

$$\alpha = \frac{1}{n}\Sigma_{a=1}^{a=n}(c_M - c_a)$$

Equation (24)

The eminence score generator 140 may determine the LIKERT quality score based upon following table:

| α | ≥0.10 | [0.04, 0.10) | [−0.02, 0.04) | [−0.02, −0.10) | ≤−0.10 |
|---|---|---|---|---|---|
| Naturalness of Merged Insight | Very High | High | Similar | Low | Very Low |

If the quality of the merged insight is poor (e.g., 'low' or 'very low'), original insights in the cluster may be a preferred option to provide as output instead of the merged insight.

Figure 3:
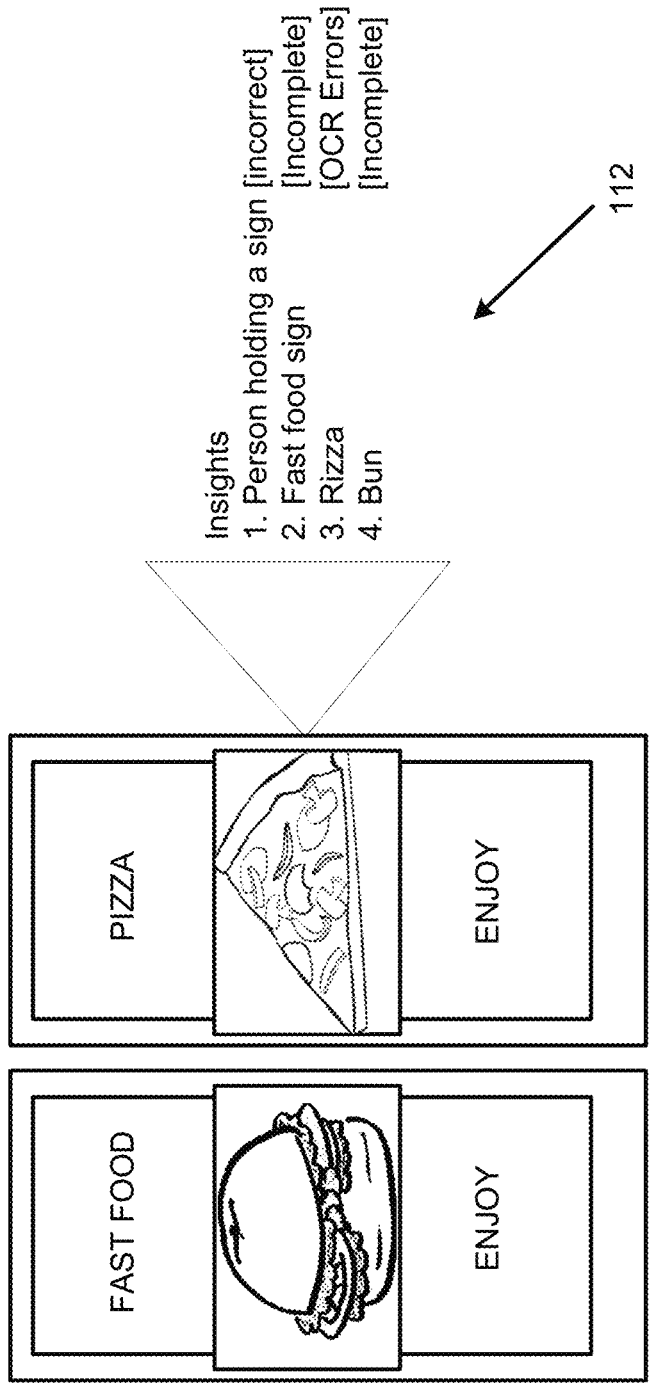
FIG. 3 illustrates an image and possible insights in accordance with an example of the present disclosure.

FIG. 3 illustrates an image and possible insights in accordance with an example of the present disclosure.

Referring to FIG. 3, the image may include a variety of objects. In this regard, a variety of insights 112 may be specified for the image 106. For example, the insights may include the following:

| 1. Person holding a sign | [Incorrect] |
| 2. Fast road sign | [Incomplete] |
| 3. Rizza | [OCR Errors] |
| 4. Bun | [Incomplete] |

With respect to FIG. 3, it can be seen that the various insights include errors such as incorrectness, incompleteness, OCR errors, etc.

FIG. 4 illustrates another image and possible insights to illustrate operation of the apparatus 100 in accordance with an example of the present disclosure.

Referring to FIG. 4, the image of FIG. 4 may include various insights 112, listed as "Insight1" to "Insight11". In this regard, the robotic agent 104 may ascertain the image 106, and as disclosed herein, the robotic agent controller 144 may perform the operation 146 that includes, for example, manipulation of an object in the image 106, confirmation of an identity of one of the people in the image 106, providing instructions to the people in the image 106 to perform specified tasks with respect to camping activities, providing instructions to the people in the image 106 to prevent camping activities, and generally, any operations related to the robotic agent 104, an object in the image 106, and/or the environment in the image 106. In this regard, the insights 112 may be designed to guide the robotic agent 104 to assess what is being performed in the image 106, and to further control activities of the robotic agent 104, and/or the people in the image 106.

FIG. 5 illustrates the aspect of multiple insights to multi-level insights to illustrate operation of the apparatus 100 in accordance with an example of the present disclosure.

Referring to FIG. 5, with respect to multiple insights to multi-level insights, as disclosed herein, various analysis may be made with respect to the insights. For example, an analysis may be made as to how reliable insights are, how atypical insights are, how concise (i.e., comprehensive yet brief) insights are, to what extent insights are to the point, how natural insights are, intrinsic semantic consistency, what are the central concepts embedded in the insights, how are insight semantically related to one another, how different clusters of insights appear with differing relatedness thresholds, clustering of insights into semantically coherent groups, extraction of SPO tuples from insights in a cluster, merging of SPO tuples from insights in a cluster, and determination of a combined insight from member insights from cluster.

With respect to the eminence score generator 140 that determines the reliability score for each insight of the plurality of insights 112, and identifies, as results, an insight of the plurality of insights 112 with a maximum reliability score, insight 1 may be determined to be least reliable, and insight 6 may be determined to be most reliable. In this case, for the example of FIGS. 4 and 5, insight 1 may include "A campground with a woman", and insight 6 may include "A scenic picnic spot with lots of trees around, mountains nearby and group of people sitting around their tents." The insights 112 may then be ranked according to their reliability score.

With respect to the eminence score generator 140 that determines the degree of atypicalness for each insight of the plurality of insights 112, and identifies, as results, an insight of the plurality of insights 112 with a maximum degree of atypicalness, insight 1 may be determined to be least atypical, and insight 4 may be determined to be most atypical. In this case, for the example of FIGS. 4 and 5, insight 1 may include "A campground with a woman", and insight 4 may include "Some trees near to a group of people camping in tents." Further, the eminence score generator 140 may determine the degree of atypicalness for concepts, and thus insights.

With respect to the eminence score generator 140 that determines the conciseness score for each insight of the plurality of insights 112, and identifies, as results, an insight of the plurality of insights 112 with a maximum conciseness score, insight 1 may be determined to be least concise, and insight 10 may be determined to be most concise. In this case, for the example of FIGS. 4 and 5, insight 1 may include "A campground with a woman", and insight 10 may include "It's a beautiful place for an outing nice mountain view so many trees good place to chill out with family and friends."

With respect to the eminence score generator 140 that determines the succinctness score for each insight of the plurality of insights 112, and identifies, as results, an insight of the plurality of insights 112 with a maximum succinctness score, insight 11 may be determined to be least succinct, and insight 3 may be determined to be most succinct. In this case, for the example of FIGS. 4 and 5, insight 11 may include "It's an awesome place for outing, rejuvenating and having fun. The view is awesome and full of greenery. Perfect place for family and friends get together", and insight 3 may include "Picnic tables and chairs with tents on a campsite." Further, with respect to succinctness, the eminence score generator 140 may determine intrinsic and relative succinctness of entities, and in turn for insights. In this regard, intrinsic succinctness may represent brevity, and relative succinctness may represent abstraction level.

FIG. 6 illustrates determination of how natural insights are (e.g., determination of potentially inconsistent or erroneous insights) by transformation of each insight into a semantic graph and estimation of a naturalness score to illustrate operation of the apparatus 100 in accordance with an example of the present disclosure.

Referring to FIG. 6, with respect to the eminence score generator 140 that determines the naturalness score for each insight of the plurality of insights 112, and identifies, as results, an insight of the plurality of insights 112 with a maximum naturalness score, insight 1 may be determined to be least consistent (e.g., least natural), and insight 3 may be determined to be most consistent (e.g., most natural). In this case, for the example of FIGS. 4-6, insight 1 may include "A campground with a woman", and insight 3 may include "Picnic tables and chairs with tents on a campsite." With respect to the naturalness score, the naturalness score may represent a degree of consistency. In this regard, each insight may be transformed into a semantic relatedness graph, and a naturalness score may be determined for each insight to select insights with very low naturalness scores. Insight 3 may be determined to include a naturalness score of 35.4%, and insight 1 may be determined to include a naturalness score of 6.1%. Insight 3 and insight 1 may be determined to include relative naturalness scores of 100% and 17%. Thus, insight 3 may be determined to be a most consistent insight, and insight 1 may be determined to be a potentially inconsistent or erroneous insight. For the insights, the error threshold $Err_{threshold}$ (ISC) may be 10% for the example of FIG. 6. The naturalness score may also be referred to as an intrinsic semantic consistency score, which may be determined based on a determination of semantic relatedness for each term of an insight, and then determining an average for an insight. The naturalness score for an insight may be determined by transforming the insight into an intrinsic semantic relatedness graph (e.g., as disclosed herein with respect to FIG. 7), and determining an intrinsic semantic consistency score. The likelihood score of all part-of-speech trigrams may be determined within the insight, and the mean likelihood score across all trigrams for the insight may represent a part-of-speech score for the insight. The naturalness score may be determined as an average of the intrinsic semantic consistency score and the part-of-speech score. As disclosed herein, insights may be ranked with respect to the eminence score, which may include the naturalness score.

Figure 7:
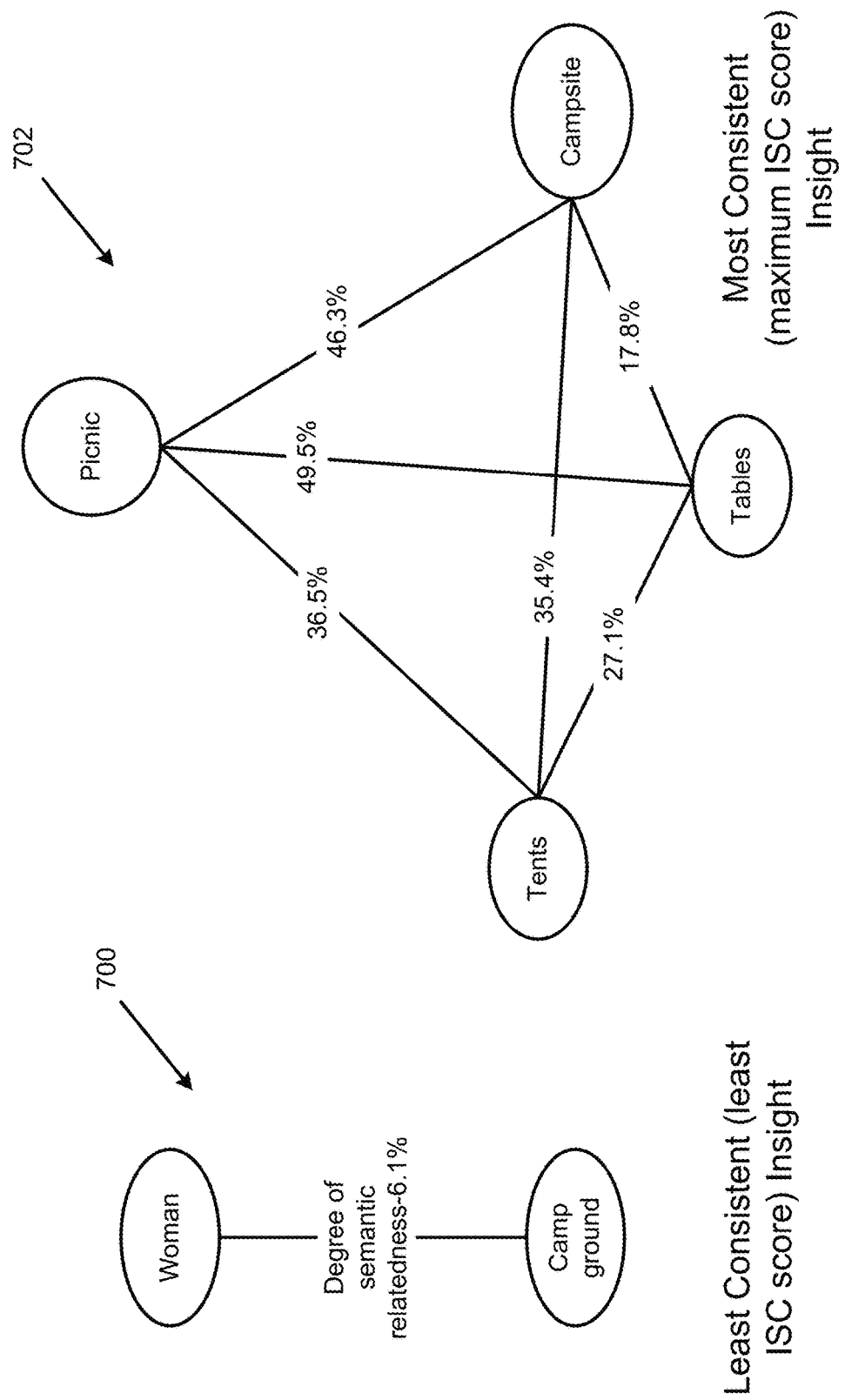
FIG. 7 illustrates intrinsic semantic relatedness graphs to illustrate operation of the natural language unification based robotic agent control apparatus of FIG. 1 in accordance with an example of the present disclosure.

FIG. 7 illustrates intrinsic semantic relatedness graphs to illustrate operation of the apparatus 100 in accordance with an example of the present disclosure.

Referring to FIG. 7, with respect to the semantic relatedness graphs, the least consistent insight of FIG. 6 (e.g., insight 1) may include a semantic graph at 700, and the most consistent insight of FIG. 6 (e.g., insight 3) may include a semantic graph at 702. The semantic relatedness graphs may also include the degree of semantic relatedness.

Figure 8:
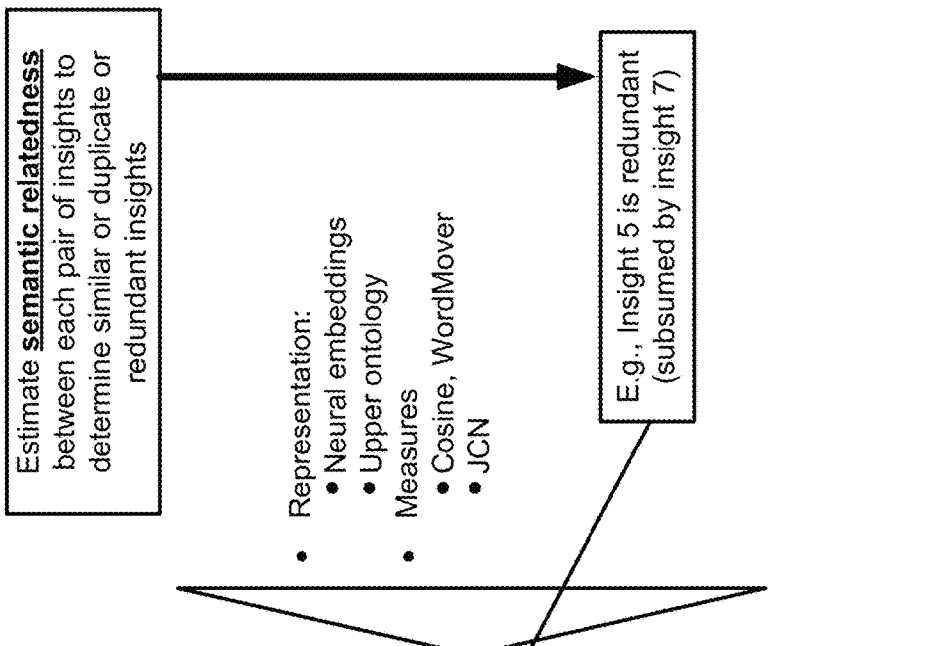
FIG. 8 illustrates estimation of semantic relatedness to identify duplicate (e.g., redundant) insights to illustrate operation of the natural language unification based robotic agent control apparatus of FIG. 1 in accordance with an example of the present disclosure.

FIG. 8 illustrates estimation of semantic relatedness to identify duplicate (e.g., redundant) insights to illustrate operation of the apparatus 100 in accordance with an example of the present disclosure.

Referring to FIG. 8, the semantic relatedness analyzer 114 may determine semantic relatedness among insights for eliminating redundancies. In this regard, the semantic relatedness analyzer 114 may estimate semantic relatedness between each pair of insights to determine similar (e.g., highly related), or duplicate, or redundant insights. For the example of FIGS. 4-8, insight 5 may be determined to be redundant (e.g., subsumed by insight 7). For the example of FIGS. 4-8, with respect to semantic relatedness, representations may include neural embeddings, and upper ontology. Further, measures may include Cosine, WordMover, JCN, etc.

Figure 9:
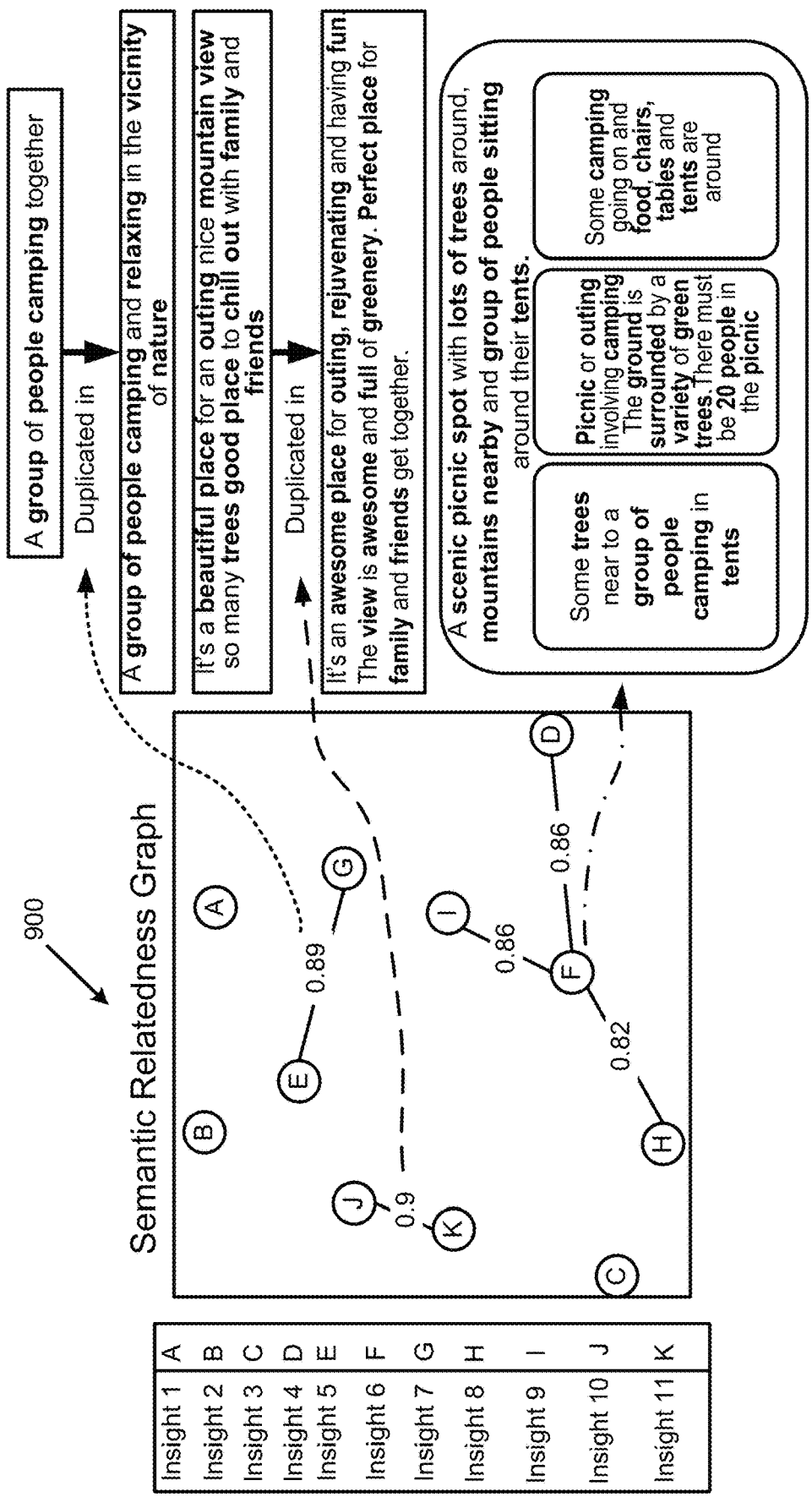
FIG. 9 illustrates further details of estimation of semantic relatedness to illustrate operation of the natural language unification based robotic agent control apparatus of FIG. 1 in accordance with an example of the present disclosure.

FIG. 9 illustrates further details of estimation of semantic relatedness to illustrate operation of the apparatus 100 in accordance with an example of the present disclosure.

Referring to FIG. 13, a semantic relatedness graph may be generated as shown at 900. The semantic relatedness graph may be used to estimate semantic relatedness. For example, insight 5 (A group of people camping together) may be duplicated in insight 7 (A group of people camping and relaxing in the vicinity of nature) and insight 10 (It's a beautiful place for an outing nice mountain view so many). Further, insights 7 and 10 may be duplicated in insight 11 (It's an awesome place for outing, rejuvenating and having fun. The view is awesome and full of greenery. Perfect place for family and friends get together). Similarly, insight 6 (A scenic picnic spot with lots of trees around, mountains nearby and group of people sitting around their tents) may include insight 4 (Some trees near to a group of people camping in tents), insight 9 (Picnic or outing involving camping. The ground is surrounded by a variety of green trees. There must be 20 people in the picnic), and insight 8 (Some camping going on and food, chairs, tables and tents are around).

FIG. 10 illustrates determination of central concepts embedded in insights to illustrate operation of the apparatus 100 in accordance with an example of the present disclosure.

Referring to FIG. 10, the central concepts identifier 122 may identify central concepts embedded within insights. In this regard, the central concepts identifier 122 may extract concepts from insights. The semantic relatedness analyzer 114 may determine semantic relatedness among insights for eliminating redundancies. For example, the semantic relatedness analyzer 114 may determine different semantic relatedness among concept terms across insights including semantic relatedness, ontological relations, and dependencies. Further, the semantic relatedness analyzer 114 may generate the concept graph for each insight using semantic relatedness among concept terms. For example, the semantic relatedness analyzer 114 may generate the concept graph and determine (e.g., estimate) a semantic centrality measure for each concept term to determine central concepts. For the example of FIGS. 4-10, the central concepts identifier 122 may identify central concepts embedded within insights as camp, people, tents, and trees.

FIG. 11 illustrates determination of semantic relatedness between insights to illustrate operation of the apparatus 100 in accordance with an example of the present disclosure.

Referring to FIG. 11, the insights cluster generator 126 may cluster insights based on a semantic relatedness graph among insights. For example, the insights cluster generator 126 may apply graph clustering techniques to determine groups of highly related insights.

FIG. 12 illustrates relatedness thresholds with respect to clusters to illustrate operation of the apparatus 100 in accordance with an example of the present disclosure.

Referring to FIG. 12, different clusters of insights may appear with differing relatedness thresholds. For example, any clusters with relatedness thresholds greater than 0.75 may be displayed as shown in FIG. 12.

FIG. 13 illustrates clustering insights into semantically coherent groups to illustrate operation of the apparatus 100 in accordance with an example of the present disclosure.

Referring to FIG. 13, for the example of FIGS. 4-13, the insights may be clustered into clusters 1, 2, 3, and 4. For example, cluster 1 may include "A campground with a woman", cluster 2 may include "Among trees and bushes there is a camping site and bushes", etc.

Figure 14:
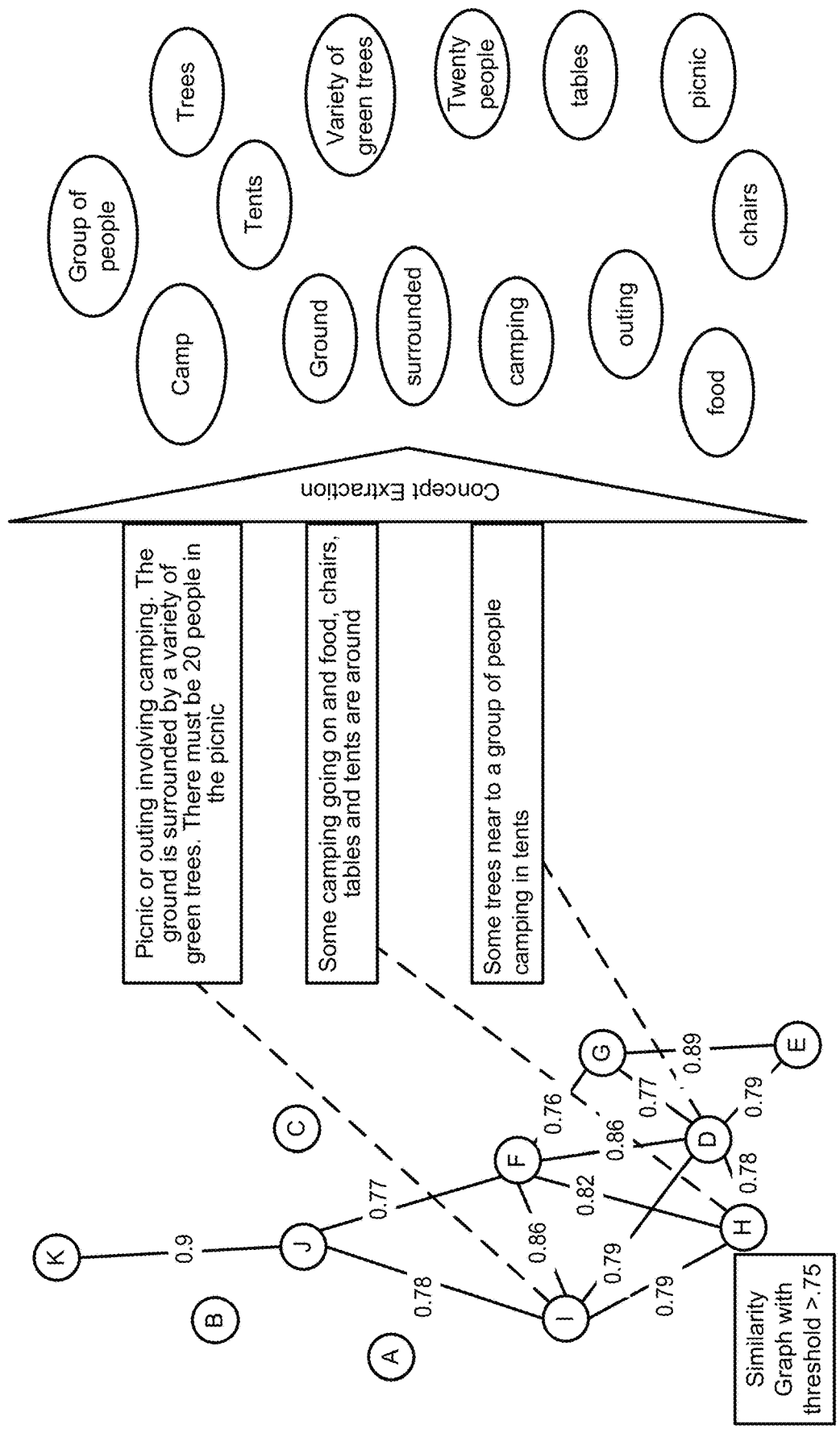
FIG. 14 illustrates concept extraction to illustrate operation of the natural language unification based robotic agent control apparatus of FIG. 1 in accordance with an example of the present disclosure.

FIG. 14 illustrates concept extraction to illustrate operation of the apparatus 100 in accordance with an example of the present disclosure.

Referring to FIG. 14, with respect to concept extraction, concepts may be extracted from insights from the semantic relatedness graph. For example, for the insights "Picnic or outing involving camping. The ground is surrounded by a variety of green trees. There must be 20 people in the picnic", "Some camping going on and food, chairs, tables and tents are around", and "Some trees near to a group of people camping in tents", concepts such as "camp", "group of people", "trees", "tents", etc., may be extracted.

Figure 15:
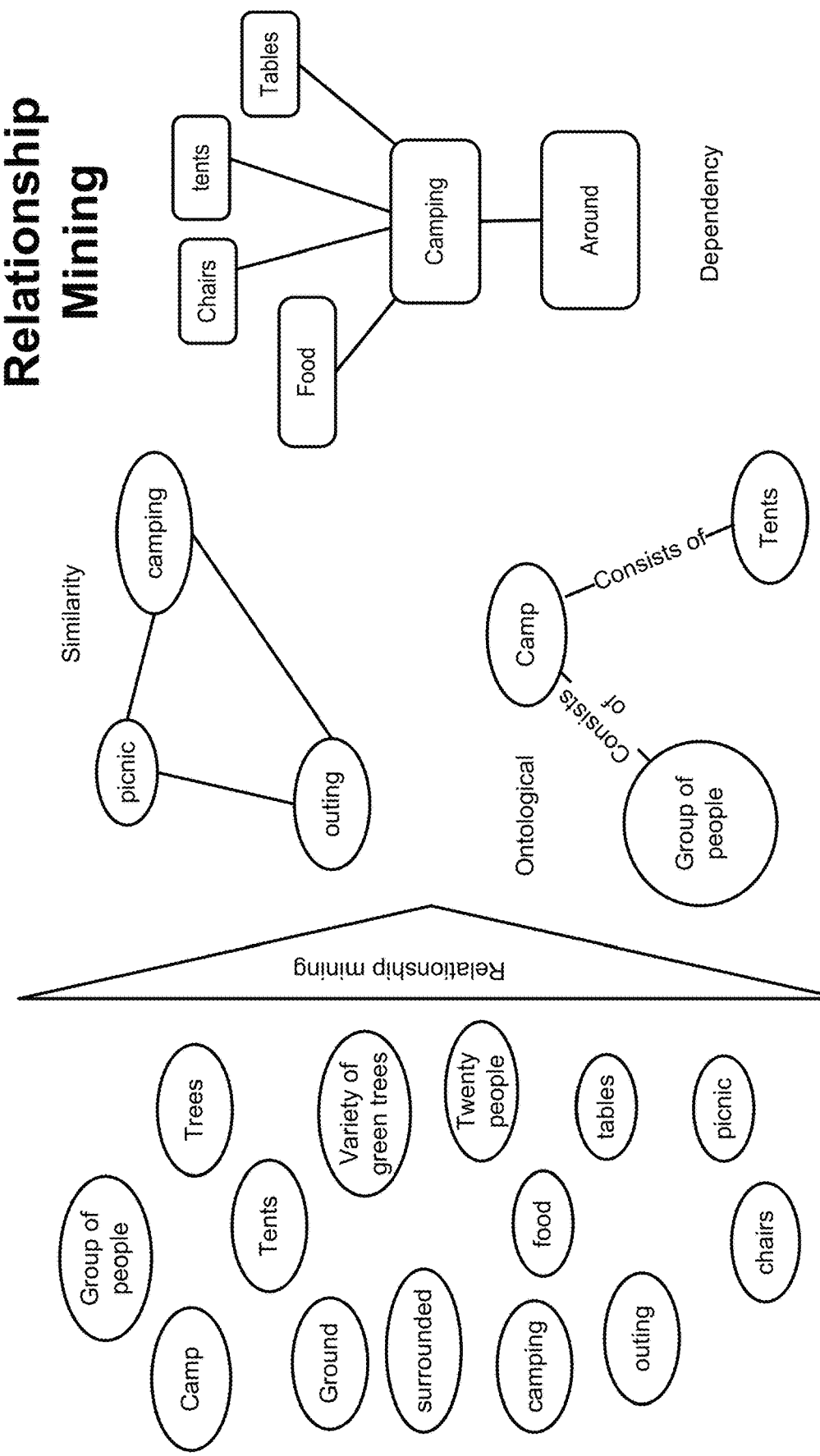
FIG. 15 illustrates relationship mining to illustrate operation of the natural language unification based robotic agent control apparatus of FIG. 1 in accordance with an example of the present disclosure.

FIG. 15 illustrates relationship mining to illustrate operation of the apparatus 100 in accordance with an example of the present disclosure.

Referring to FIG. 15, for the extracted concepts from FIG. 14, relationship mining may be performed. For example, the relationship mining may include dependency relationships 134, semantic relatedness relationships 136, and ontological relationships 138.

Figure 16:
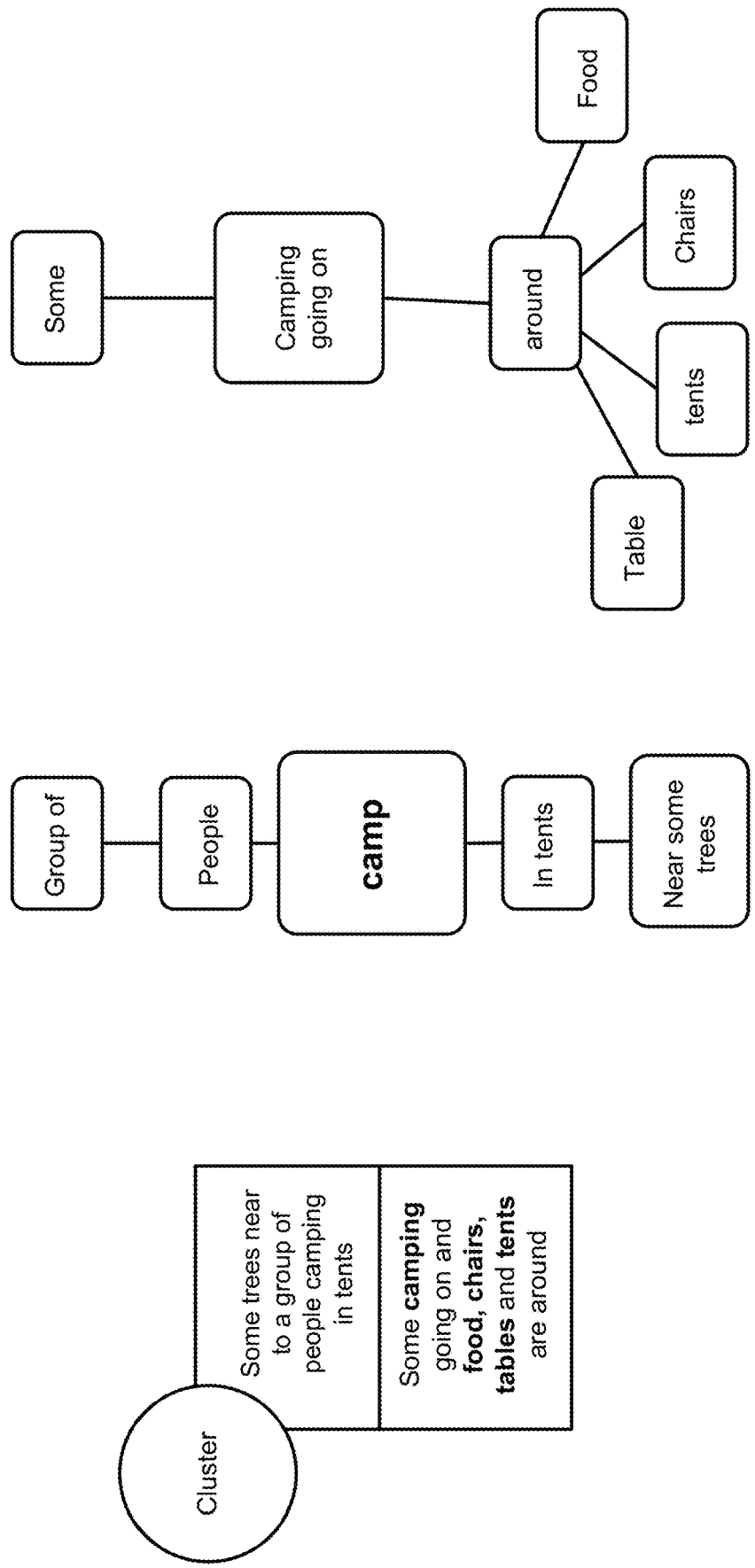
FIG. 16 illustrates extraction of subject, predicate, and object (SPO) tuples from insights in a cluster to illustrate operation of the natural language unification based robotic agent control apparatus of FIG. 1 in accordance with an example of the present disclosure.

FIG. 16 illustrates extraction of subject, predicate, and object (SPO) tuples from insights in a cluster to illustrate operation of the apparatus 100 in accordance with an example of the present disclosure.

Referring to FIG. 16, SPO tuples may be extracted from the insights "Some trees near to a group of people camping in tents" and "Some camping going on and food, chairs, tables and tents are around".

Figure 17:
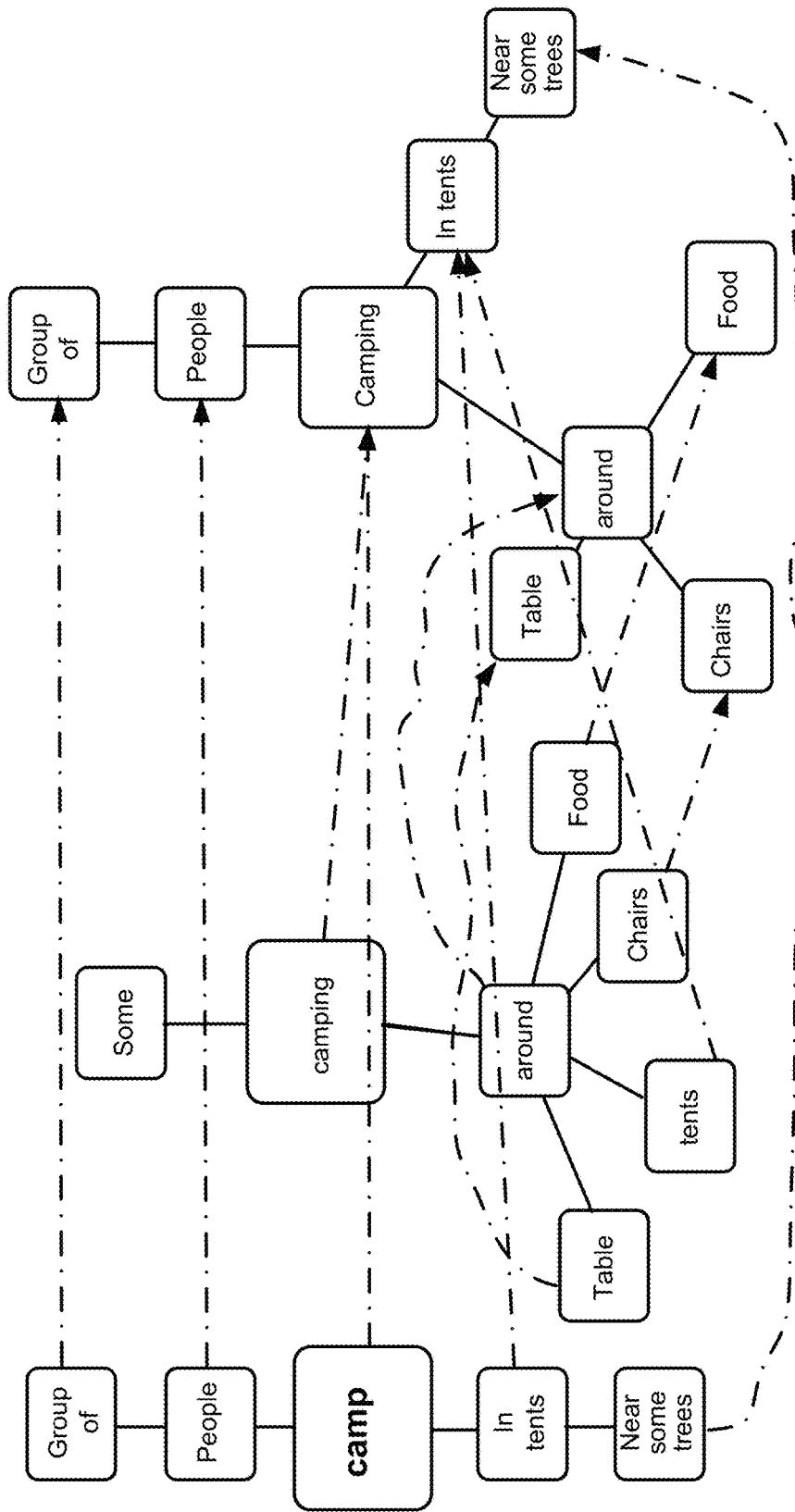
FIG. 17 illustrates merging of SPO tuples from insights in a cluster to illustrate operation of the natural language unification based robotic agent control apparatus of FIG. 1 in accordance with an example of the present disclosure.

FIG. 17 illustrates merging of SPO tuples from insights in a cluster to illustrate operation of the apparatus 100 in accordance with an example of the present disclosure.

Referring to FIG. 17, SPO tuples may be merged as shown per the dashed lines and arrows.

Figure 18:
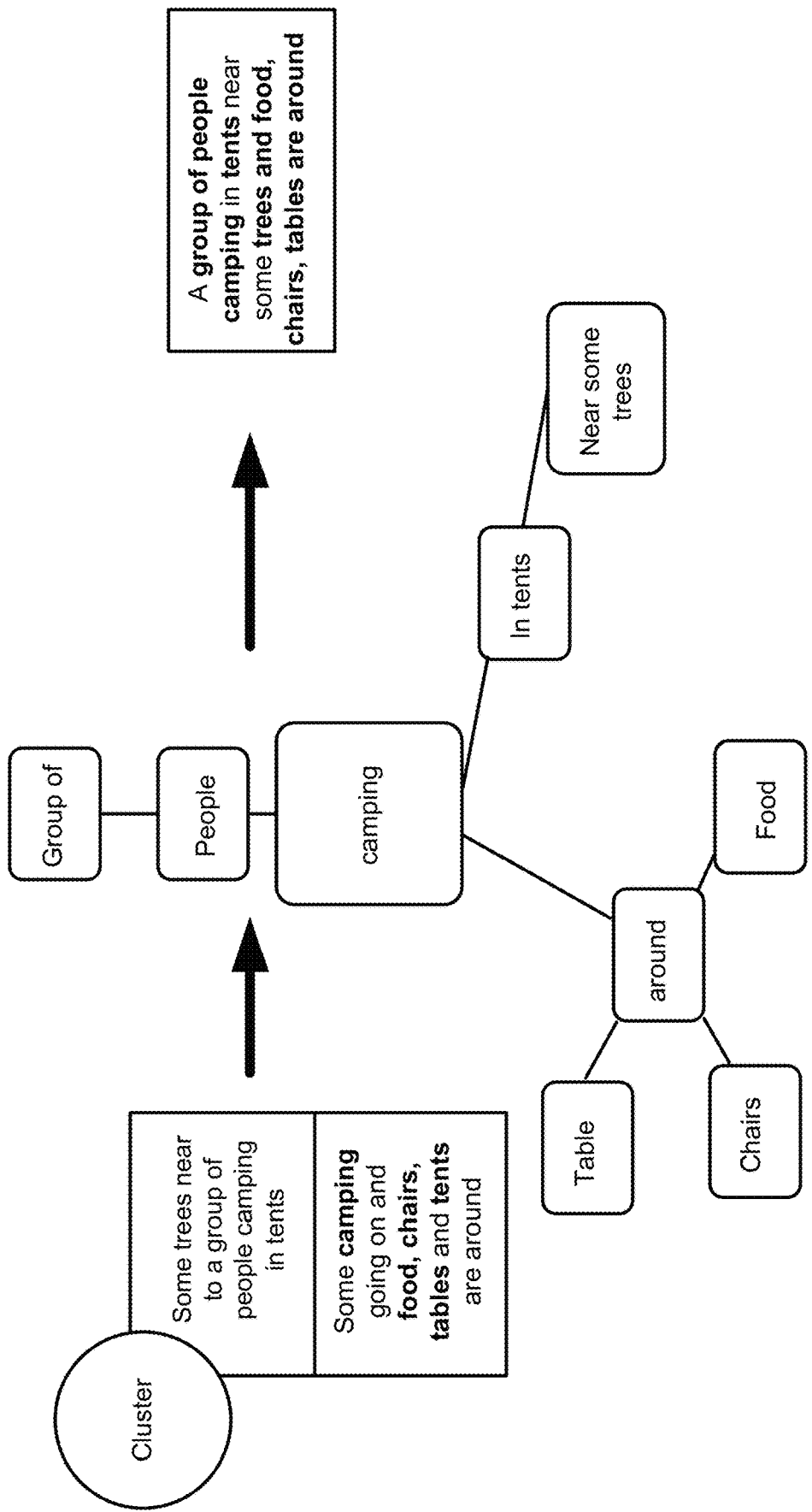
FIG. 18 illustrates determination of combined insight from member insights from a cluster to illustrate operation of the natural language unification based robotic agent control apparatus of FIG. 1 in accordance with an example of the present disclosure.

FIG. 18 illustrates determination of the unified insight 132 from member insights from a cluster to illustrate operation of the apparatus 100 in accordance with an example of the present disclosure.

Referring to FIG. 18, the unified insights generator 130 may generate unified insights. For the example of FIG. 18 (e.g., FIGS. 4-18), the unified insight may include "A group of people camping in tents near some trees and food, chairs, tables are around."

Figure 21:
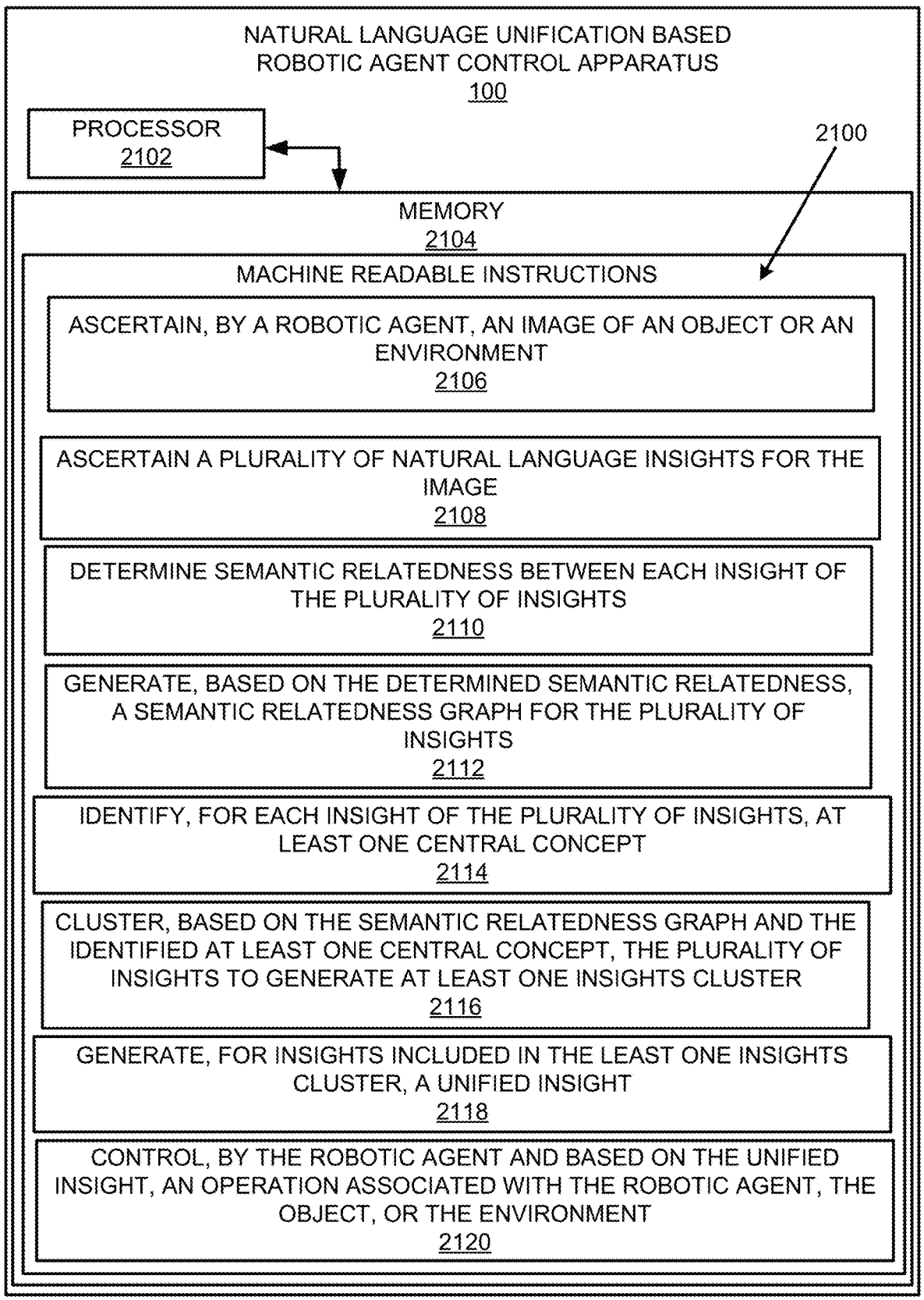
FIG. 21 illustrates an example block diagram for natural language unification based robotic agent control in accordance with an example of the present disclosure.
Figure 22:
FIG. 22 illustrates a flowchart of an example method for natural language unification based robotic agent control in accordance with an example of the present disclosure.
Figure 23:
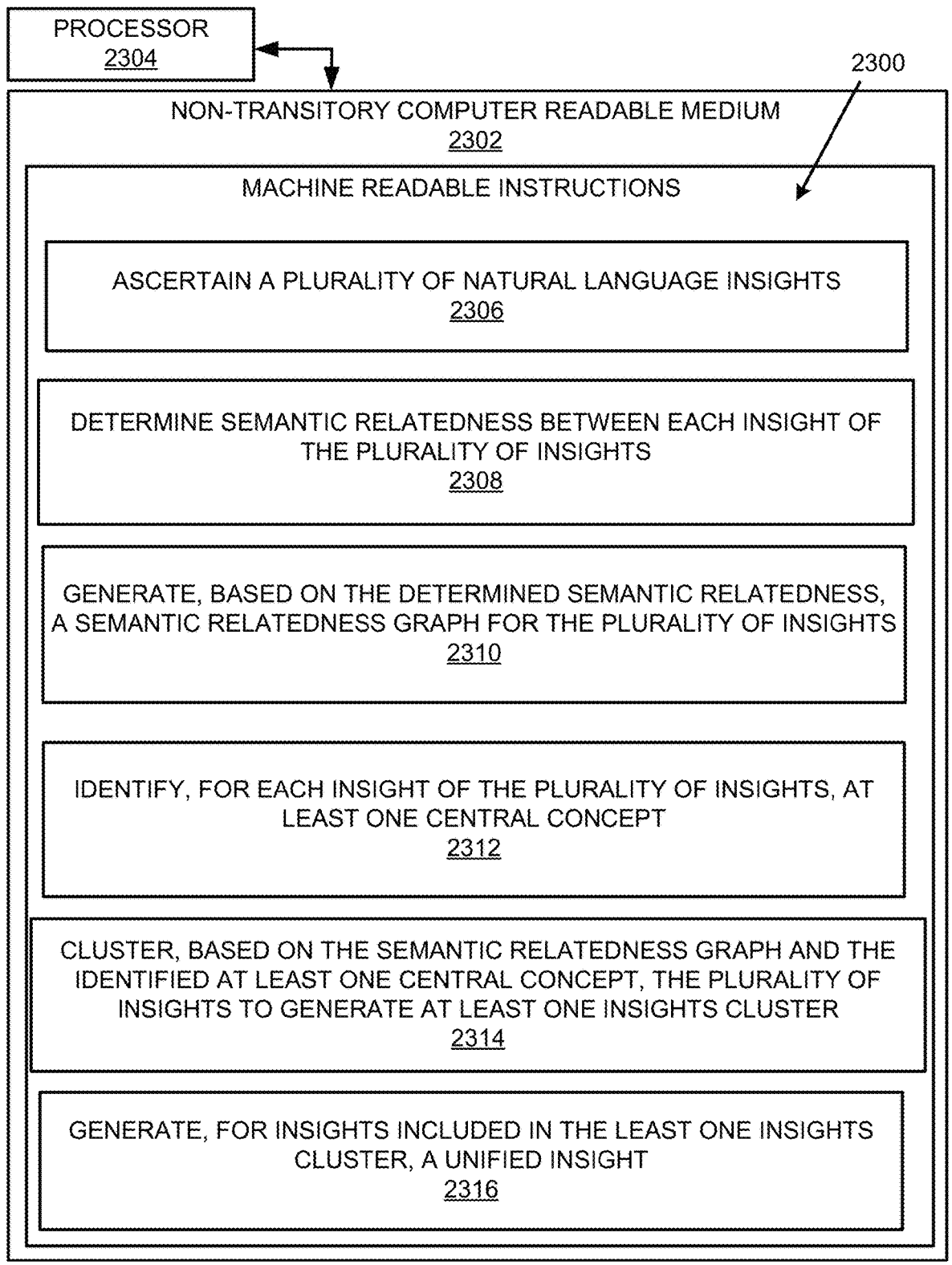
FIG. 23 illustrates a further example block diagram for natural language unification based robotic agent control in accordance with another example of the present disclosure.

FIGS. 21-23 respectively illustrate an example block diagram 2100, a flowchart of an example method 2200, and a further example block diagram 2300 for natural language unification based robotic agent control, according to examples. The block diagram 2100, the method 2200, and the block diagram 2300 may be implemented on the apparatus 100 described above with reference to FIG. 1 by way of example and not of limitation. The block diagram 2100, the method 2200, and the block diagram 2300 may be practiced in other apparatus. In addition to showing the block diagram 2100, FIG. 21 shows hardware of the apparatus 100 that may execute the instructions of the block diagram 2100. The hardware may include a processor 2102, and a memory 2104 storing machine readable instructions that when executed by the processor cause the processor to perform the instructions of the block diagram 2100. The memory 2104 may represent a non-transitory computer readable medium. FIG. 22 may represent an example method for natural language unification based robotic agent control, and the steps of the method. FIG. 23 may represent a non-transitory computer readable medium 2302 having stored thereon machine readable instructions to provide natural language unification based robotic agent control according to an example. The machine readable instructions, when executed, cause a processor 2304 to perform the instructions of the block diagram 2300 also shown in FIG. 23.

The processor 2102 of FIG. 21 and/or the processor 2304 of FIG. 23 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2302 of FIG. 23), such as hardware storage devices (e.g., RAM (random access memory), ROM (read only memory), EPROM (erasable, programmable ROM), EEPROM (electrically erasable, programmable ROM), hard drives, and flash memory). The memory 2104 may include a RAM, where the machine readable instructions and data for a processor may reside during runtime.

Referring to FIGS. 1-21, and particularly to the block diagram 2100 shown in FIG. 21, the memory 2104 may include instructions 2106 to ascertain, by a robotic agent 104, an image 106 of an object 108 or an environment 110.

The processor 2102 may fetch, decode, and execute the instructions 2108 to ascertain a plurality of natural language insights 112 for the image 106.

The processor 2102 may fetch, decode, and execute the instructions 2110 to determine semantic relatedness 116 between each insight of the plurality of insights 112.

The processor 2102 may fetch, decode, and execute the instructions 2112 to generate, based on the determined semantic relatedness 116, a semantic relatedness graph 120 for the plurality of insights 112.

The processor 2102 may fetch, decode, and execute the instructions 2114 to identify, for each insight of the plurality of insights 112, at least one central concept 124.

The processor 2102 may fetch, decode, and execute the instructions 2116 to cluster, based on the semantic relatedness graph 120 and the identified at least one central concept 124, the plurality of insights 112 to generate at least one insights cluster 128.

The processor 2102 may fetch, decode, and execute the instructions 2118 to generate, for insights 112 included in the least one insights cluster 128, a unified insight 132.

The processor 2102 may fetch, decode, and execute the instructions 2120 to control, by the robotic agent 104 and based on the unified insight 132, an operation associated with the robotic agent 104, the object 108, or the environment 110.

Referring to FIGS. 1-20 and 22, and particularly FIG. 22, for the method 2200, at block 2202, the method may include ascertaining, by a robotic agent 104, an image 106 of an object 108 or an environment 110.

At block 2204, the method may include ascertaining, by at least one processor, a plurality of natural language insights 112 for the image 106.

At block 2206, the method may include determining, by the at least one processor, semantic relatedness 116 between each insight of the plurality of insights 112.

At block 2208, the method may include generating, by the at least one processor, based on the determined semantic relatedness 116, a semantic relatedness graph 120 for the plurality of insights 112.

At block 2210, the method may include identifying, by the at least one processor, for each insight of the plurality of insights 112, at least one central concept 124.

At block 2212, the method may include clustering, by the at least one processor, based on the semantic relatedness graph 120 and the identified at least one central concept 124, the plurality of insights 112 to generate a plurality of insights clusters.

At block 2214, the method may include generating, by the at least one processor, for insights 112 included in the plurality of insights clusters, a unified insight 132 for each insights cluster 128 of the plurality of insights clusters.

At block 2216, the method may include ranking, by the at least one processor, each unified insight 132 according to a ranking criterion (e.g., the eminence score).

At block 2218, the method may include controlling, by the at least one processor, by the robotic agent 104 and based on a highest ranked unified insight 132, an operation associated with the robotic agent 104, the object 108, or the environment 110.

Referring to FIGS. 1-20 and 23, and particularly FIG. 23, for the block diagram 2300, the non-transitory computer readable medium 2302 may include instructions 2306 to ascertain a plurality of natural language insights 112.

The processor 2304 may fetch, decode, and execute the instructions 2308 to determine semantic relatedness 116 between each insight of the plurality of insights 112.

The processor 2304 may fetch, decode, and execute the instructions 2310 to generate, based on the determined semantic relatedness 116, a semantic relatedness graph 120 for the plurality of insights 112.

The processor 2304 may fetch, decode, and execute the instructions 2312 to identify, for each insight of the plurality of insights 112, at least one central concept 124.

The processor 2304 may fetch, decode, and execute the instructions 2314 to cluster, based on the semantic relatedness graph 120 and the identified at least one central concept 124, the plurality of insights 112 to generate at least one insights cluster 128.

The processor 2304 may fetch, decode, and execute the instructions 2316 to generate, for insights 112 included in the least one insights cluster 128, a unified insight 132.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A natural language unification based robotic agent control apparatus comprising:
   an insight analyzer, executed by at least one hardware processor, to
      ascertain, by a robotic agent, an image of an object or an environment, and
      ascertain a plurality of natural language insights for the image;
   a semantic relatedness analyzer, executed by the at least one hardware processor, to
      determine semantic relatedness between each insight of the plurality of insights;
   a semantic relatedness graph generator, executed by the at least one hardware processor, to
      generate, based on the determined semantic relatedness, a semantic relatedness graph for the plurality of insights;
   a central concepts identifier, executed by the at least one hardware processor, to
      identify, for each insight of the plurality of insights, at least one central concept;
   an insights cluster generator, executed by the at least one hardware processor, to
      cluster, based on the semantic relatedness graph and the identified at least one central concept, the plurality of insights to generate at least one insights cluster;
   a unified insights generator, executed by the at least one hardware processor, to
      generate, for insights included in the least one insights cluster, a unified insight;
   an eminence score generator, executed by the at least one hardware processor, to
      generate an eminence score for each unified insight of a plurality of unified insights including the unified insight; and
   a robotic agent controller, executed by the at least one hardware processor, to
      control, by the robotic agent and based on the eminence score and the unified insight, an operation associated with the robotic agent, the object, or the environment.

2. The apparatus according to claim 1, wherein the semantic relatedness analyzer is to determine semantic relatedness between each insight of the plurality of insights by:
   determining, based on the determined semantic relatedness, whether an insight of the plurality of insights is a duplicate of another insight of the plurality of insights; and
   based on a determination that the insight of the plurality of insights is the duplicate of the other insight of the plurality of insights, removing the insight of the plurality of insights to generate a set of non-redundant insights.

3. The apparatus according to claim 1, wherein the unified insights generator is to generate, for the insights included in the least one insights cluster, the unified insight by:
   analyzing, for the insights included in the at least one insights cluster,
      dependency relationships between the identified at least one central concept,
      semantic relatedness relationships between the identified at least one central concept, and
      ontological relationships between the identified at least one central concept; and
   generating, based on the dependency relationships, the semantic relatedness relationships, and the ontological relationships, the unified insight.

4. The apparatus according to claim 3, wherein the unified insights generator is to generate, for the insights included in the least one insights cluster, the unified insight by:
   extracting, for the insights included in the least one insights cluster, subject, predicate, and object tuples; and
   generating, based on the extraction of the subject, predicate, and object tuples, the unified insight.

5. The apparatus according to claim 4, wherein the unified insights generator is to generate, for the insights included in the least one insights cluster, the unified insight by:
   merging the extracted subject, predicate, and object tuples; and
   generating, based on the merged subject, predicate, and object tuples, the unified insight.

6. The apparatus according to claim 5, wherein the unified insights generator is to extract, for the insights included in the least one insights cluster, subject, predicate, and object tuples, and merge the extracted subject, predicate, and object tuples by:
   generating dependency parse trees for the insights included in the least one insights cluster; and
   merging, based on the dependency parse trees, the extracted subject, predicate, and object tuples.

7. The apparatus according to claim 1, wherein the semantic relatedness analyzer is to determine semantic relatedness between each insight of the plurality of insights by:
   identifying terms of an insight; and
   determining, for each term of the identified terms, a relevance to all other terms of the insight.

8. The apparatus according to claim 1,
wherein the eminence score generator is to
rank each unified insight of the plurality of unified insights according to the eminence scores, and
wherein the robotic agent controller is to control, by the robotic agent and based on the unified insight, the operation associated with the robotic agent, the object, or the environment by:
controlling, by the robotic agent and based on a highest ranked unified insight, the operation associated with the robotic agent, the object, or the environment.

9. The apparatus according to claim 1, wherein the unified insights generator is to generate, for the insights included in the least one insights cluster, the unified insight by:
identifying, for the insights included in the at least one insights cluster, an insight including a highest number of concept terms;
designating the insight including the highest number of concept terms as a base insight; and
expanding the base insight to generate the unified insight.

10. The apparatus according to claim 1, wherein the unified insights generator is to generate, for the insights included in the least one insights cluster, the unified insight by:
determining, for each of the insights included in the at least one insights cluster, subject, predicate, and object tuples;
generating a semantic relatedness graph for predicates of the determined subject, predicate, and object tuples;
determining, for the semantic relatedness graph generated for the predicates of the determined subject, predicate, and object tuples, whether an edge includes a weight that is less than a specified weight; and
based on a determination that the edge includes the weight that is less than the specified weight, removing the edge with respect to the unified insight.

11. The apparatus according to claim 1, wherein the unified insights generator is to generate, for the insights included in the least one insights cluster, the unified insight by:
determining, for each of the insights included in the at least one insights cluster, subject, predicate, and object tuples;
generating a semantic relatedness graph for predicates of the determined subject, predicate, and object tuples;
determining, for the semantic relatedness graph generated for the predicates of the determined subject, predicate, and object tuples, whether an edge includes a weight that is greater than a specified weight; and
based on a determination that the edge includes the weight that is greater than the specified weight, utilizing the edge to generate the unified insight.

12. A method for natural language unification based robotic agent control, the method comprising:
ascertaining, by a robotic agent, an image of an object or an environment;
ascertaining, by at least one processor, a plurality of natural language insights for the image;
determining, by the at least one processor, semantic relatedness between each insight of the plurality of insights;
generating, by the at least one processor, based on the determined semantic relatedness, a semantic relatedness graph for the plurality of insights;
identifying, by the at least one processor, for each insight of the plurality of insights, at least one central concept;
clustering, by the at least one processor, based on the semantic relatedness graph and the identified at least one central concept, the plurality of insights to generate a plurality of insights clusters;
generating, by the at least one processor, for insights included in the plurality of insights clusters, a unified insight for each insights cluster of the plurality of insights clusters;
ranking, by the at least one processor, each unified insight according to a ranking criterion; and
controlling, by the at least one processor, by the robotic agent and based on a highest ranked unified insight, an operation associated with the robotic agent, the object, or the environment.

13. The method according to claim 12, wherein determining, by the at least one processor, the semantic relatedness between each insight of the plurality of insights further comprises:
determining, based on the determined semantic relatedness, whether an insight of the plurality of insights is a duplicate of another insight of the plurality of insights; and
based on a determination that the insight of the plurality of insights is the duplicate of the other insight of the plurality of insights, removing the insight of the plurality of insights to generate a set of non-redundant insights.

14. The method according to claim 12, wherein generating, by the at least one processor, for the insights included in the plurality of insights clusters, the unified insight for each insights cluster of the plurality of insights clusters further comprises:
analyzing, for the insights included in the plurality of insights clusters,
dependency relationships between the identified at least one central concept,
semantic relatedness relationships between the identified at least one central concept, and
ontological relationships between the identified at least one central concept; and
generating, based on the dependency relationships, the semantic relatedness relationships, and the ontological relationships, the unified insight for each insights cluster of the plurality of insights clusters.

15. The method according to claim 14, wherein generating, by the at least one processor, for the insights included in the plurality of insights clusters, the unified insight for each insights cluster of the plurality of insights clusters further comprises:
extracting, for the insights included in the plurality of insights clusters, subject, predicate, and object tuples; and
generating, based on the extraction of the subject, predicate, and object tuples, the unified insight for each insights cluster of the plurality of insights clusters.

16. The method according to claim 15, wherein generating, by the at least one processor, for the insights included in the plurality of insights clusters, the unified insight for each insights cluster of the plurality of insights clusters further comprises:
merging the extracted subject, predicate, and object tuples; and
generating, based on the merged subject, predicate, and object tuples, the unified insight for each insights cluster of the plurality of insights clusters.

17. The method according to claim 16, wherein extracting, for the insights included in the plurality of insights clusters, subject, predicate, and object tuples, and merging the extracted subject, predicate, and object tuples, further comprises:
- generating dependency parse trees for the insights included in the plurality of insights clusters; and
- merging, based on the dependency parse trees, the extracted subject, predicate, and object tuples.

18. A non-transitory computer readable medium having stored thereon machine readable instructions, the machine readable instructions, when executed by at least one hardware processor, cause the at least one hardware processor to:
- ascertain a plurality of natural language insights for an image of an object or an environment;
- determine semantic relatedness between each insight of the plurality of insights;
- generate, based on the determined semantic relatedness, a semantic relatedness graph for the plurality of insights;
- identify, for each insight of the plurality of insights, at least one central concept;
- cluster, based on the semantic relatedness graph and the identified at least one central concept, the plurality of insights to generate a plurality of insights clusters;
- generate, for insights included in the plurality of insights cluster, a unified insight for each insights cluster of the plurality of insights clusters;
- rank each unified insight according to a ranking criterion; and
- control, based on a highest ranked unified insight, an operation associated with the object or the environment.

19. The non-transitory computer readable medium according to claim 18, wherein the machine readable instructions to determine semantic relatedness between each insight of the plurality of insights, when executed by the at least one hardware processor, further cause the at least one hardware processor to:
- identify terms of an insight; and
- determine, for each term of the identified terms, a relevance to all other terms of the insight.

20. The non-transitory computer readable medium according to claim 18, wherein the machine readable instructions to generate, for the insights included in the plurality of insights clusters, the unified insight for each insights cluster of the plurality of insights clusters, when executed by the at least one hardware processor, further cause the at least one hardware processor to:
- identify, for the insights included in the plurality of insightclusters, an insight including a highest number of concept terms;
- designate the insight including the highest number of concept terms as a base insight; and
- expand the base insight to generate the unified insight.

* * * * *

UNITED STATES PATENT AND TRADEMARK OFFICE
CERTIFICATE OF CORRECTION

PATENT NO. : 11,062,142 B2
APPLICATION NO. : 16/020566
DATED : July 13, 2021
INVENTOR(S) : Janardan Misra et al.

It is certified that error appears in the above-identified patent and that said Letters Patent is hereby corrected as shown below:

In the Claims

In Column 32, Line 21, Claim 20, reads "insightclusters" should read "insights clusters".

Signed and Sealed this
Thirty-first Day of May, 2022

Katherine Kelly Vidal
*Director of the United States Patent and Trademark Office*